US012633064B2

(12) United States Patent
Rasmussen et al.

(10) Patent No.: US 12,633,064 B2
(45) Date of Patent: May 19, 2026

(54) LATENCY REDUCTION FOR IMMERSIVE CONTENT PRODUCTION SYSTEMS

(71) Applicant: Lucasfilm Entertainment Company Ltd. LLC, San Francisco, CA (US)

(72) Inventors: Nicholas Rasmussen, San Francisco, CA (US); Lutz Latta, San Francisco, CA (US)

(73) Assignee: Lucasfilm Entertainment Company Ltd. LLC, San Francisco, CA (US)

( * ) Notice: Subject to any disclaimer, the term of this patent is extended or adjusted under 35 U.S.C. 154(b) by 293 days.

(21) Appl. No.: 18/371,402

(22) Filed: Sep. 21, 2023

(65) Prior Publication Data

US 2024/0096035 A1     Mar. 21, 2024

Related U.S. Application Data

(60) Provisional application No. 63/408,732, filed on Sep. 21, 2022.

(51) Int. Cl.
| | |
|---|---|
| *G06T 1/20* | (2006.01) |
| *G06T 7/20* | (2017.01) |
| *G06T 19/00* | (2011.01) |

(52) U.S. Cl.
CPC .............. *G06T 19/006* (2013.01); *G06T 1/20* (2013.01); *G06T 7/20* (2013.01)

(58) Field of Classification Search
CPC   G06T 1/20; G06T 3/4038; G06T 7/20; G06T 19/006
USPC ......................................... 345/419, 505, 633
See application file for complete search history.

(56) References Cited

U.S. PATENT DOCUMENTS

| | | | |
|---|---|---|---|
| 7,372,465 B1 * | 5/2008 | Tamasi ...................... | G06T 1/20 |
| | | | 345/503 |
| 2011/0181601 A1 | 7/2011 | Mumbauer et al. | |
| 2015/0078621 A1 | 3/2015 | Choi et al. | |
| 2020/0143592 A1 * | 5/2020 | Cordes ................... | G06T 15/50 |

FOREIGN PATENT DOCUMENTS

| | | |
|---|---|---|
| KR | 20180052496 A | 5/2018 |
| KR | 20200067641 A | 6/2020 |
| KR | 20210015436 A | 2/2021 |

OTHER PUBLICATIONS

PCT/US2023/033410, "International Search Report and Written Opinion", Jan. 18, 2024, 8 pages.

* cited by examiner

*Primary Examiner* — Jacinta M Crawford
(74) *Attorney, Agent, or Firm* — Kilpatrick Townsend & Stockton LLP

(57)     ABSTRACT

A method of content production may include receiving tracking information for a camera with a frustum configured to capture images of a subject in an immersive environment. a first image of a virtual environment corresponding to the frustum may be rendered using a first rendering process based on the tracking information to be perspective-correct when displayed on the displays and viewed through the camera. A second image of the virtual environment may also be rendered using a second rendering process for a specific display. The first image and the second image may be rendered in parallel. The second image and a portion of the first image may be composited together to generate a composite image, where the portion of the first image may correspond to a portion of the display captured by the frustum.

12 Claims, 12 Drawing Sheets

LATENCY REDUCTION FOR IMMERSIVE CONTENT PRODUCTION SYSTEMS

CROSS-REFERENCES TO RELATED APPLICATIONS

This application claims the benefit of U.S. Provisional Application No. 63/408,732, filed on Sep. 21, 2022, which is incorporated herein by reference.

FIELD

The present disclosure generally relates to generating content using one or more displays configured for operation in an immersive content production system. Specifically, this disclosure describes computer techniques for reducing latency when rendering, transmitting, compositing, and/or displaying immersive content on background screens.

BACKGROUND

An immersive reality environment may be designed to provide a fully engrossing and interactive experience. At its core, this environment leverages advanced virtual reality (VR), augmented reality (AR), large screens, or mixed reality (MR) technologies to create a sensory-rich experience. In such an environment, users wear motion-tracking sensors enabling them to explore and engage with the environment. Within an immersive environment, users may interact with objects, environments, and other users in real-time. Immersive reality environments have found applications across various industries, from gaming and entertainment to healthcare, education, and training.

Immersive environments may now play a transformative role in the creation of CGI (Computer-Generated Imagery) movie sets and the way filmmakers design, visualize, and shoot scenes. These environments enable directors, production designers, and visual effects teams to immerse themselves in a digital representation of the movie's setting, characters, and special effects, enhancing the creative process and streamlining production. For example, the pre-production phase allows filmmakers to explore and refine the movie's visual concept, experimenting with different camera angles, lighting, and set designs in a virtual space. This allows for more precise planning and visualization of complex scenes, reducing the need for costly revisions during actual shooting. Directors and designers can even collaborate in real-time within the digital set, making adjustments and decisions more efficiently.

During the production phase, immersive reality environments are utilized to virtually visit and assess locations without the need for physical travel, saving time and resources. Additionally, the use of mixed reality can help actors perform in front of green screens or interact with digital characters more naturally. This enhances the overall quality and realism of CGI-driven scenes. During post-production artists can use these environments to fine-tune the integration of CGI elements into live-action footage, ensuring seamless blending and alignment. Moreover, directors and editors can view the film within a virtual set, allowing for better decision-making when it comes to editing, color grading, and finalizing visual effects shots.

However, despite the many advantages of immersive environments, many technical challenges still exist in their implementations. Therefore, improvements in the technology are needed.

BRIEF SUMMARY

In some embodiments, a method of content production may include receiving tracking information for a camera associated with a frustum. The camera may be configured to capture images of a subject in an immersive environment comprising one or more displays. The method may also include rendering, using a first rendering process, a first image of a virtual environment corresponding to the frustum. The first image may be rendered based on the tracking information for the camera to be perspective-correct when displayed on the one or more displays and viewed through the camera. The method may additionally include rendering, using a second rendering process, a second image of the virtual environment for display on a display in the one or more displays. The first image and the second image may be rendered in parallel. The method may further include compositing the second image and a portion of the first image together to generate a composite image. The portion of the first image may correspond to a portion of the display captured by the frustum. The method may also include causing the composite image to be displayed on the display in the immersive environment.

In some embodiments, an immersive content presentation system may include a first Graphics Processing Unit (GPU) that may be configured to receive tracking information for a camera associated with a frustum. The camera may be configured to capture images of a subject in an immersive environment comprising one or more displays. The first GPU may be configured to render a first image of a virtual environment corresponding to the frustum. The first image may be rendered based on the tracking information for the camera to be perspective-correct when displayed on the one or more displays and viewed through the camera. The system may also include a second GPU that may be configured to render a second image of the virtual environment for display on a display in the one or more displays. The first image and the second image may be rendered in parallel. The system may further include one or more processors that are configured to composite the second image and a portion of the first image together to generate a composite image. The portion of the first image may correspond to a portion of the display captured by the frustum.

In some embodiments, one or more non-transitory computer-readable media may store instructions that, when executed by one or more GPUs or processors, cause the one or more GPUs or processors to perform operations including receiving tracking information for a camera associated with a frustum. The camera may be configured to capture images of a subject in an immersive environment comprising one or more displays. The operations may also include rendering, using a first GPU, a first image of a virtual environment corresponding to the frustum. The first image may be rendered based on the tracking information for the camera to be perspective-correct when displayed on the one or more displays and viewed through the camera. The operations may additionally include rendering, using a second GPU, a second image of the virtual environment for display on a display in the one or more displays. The first image and the second image may be rendered in parallel. The operations may further include compositing the second image and a portion of the first image together to generate a composite image. The portion of the first image may correspond to a portion of the display captured by the frustum. The operations may also include causing the composite image to be displayed on the display in the immersive environment.

In any embodiments, any or all of the following features may be implemented in any combination and without limitation. The composite image may be displayed as part of a real-time video sequence presented on the display at interactive frame rates. The first rendering process may be performed by a first computer system, and the second rendering process may be performed by a second computer system that is separate and distinct from the first computer system. The first computer system may include a first GPU and the second computer system may include a second GPU that may share a network connection between the first GPU and the second GPU. A third GPU may generate the composite image by directly accessing the first image in a memory of the first GPU and by directly accessing the second image in a memory of the second GPU using Remote Direct Memory Access (RDMA) operations through the network connection. The first rendering process may render the first image while the second rendering process renders the second image, and the composite image may be generated after the first image and the second image have been rendered. The second image may include a background image that is not rendered based on the tracking information for the camera. The one or more processors may include the second GPU, such that the second GPU may render the second image and may generate the composite image. A third GPU may be configured to render a third image of the virtual environment for display on a second display in the one or more displays. The first image and the third image may be rendered in parallel. The third GPU may be configured to composite the third image and a second portion of the first image together to generate a second composite image. The second portion of the first image may correspond to a portion of the second display captured by the frustum. A third GPU that is configured to receive second tracking information for a second camera associated with a second frustum, where the second camera may be configured to capture second images of a subject in the immersive environment. The third GPU may also be configured to render a third image of the virtual environment corresponding to the second frustum, where the third image may be rendered based on the second tracking information for the second camera to be perspective-correct when displayed on the one or more displays and viewed through the second camera. The first image, the second image, and the third image may be rendered in parallel. The one or more processors may be further configured to composite the second image, the portion of the first image, and a portion of the third image together to generate the composite image, where the portion of the third image may correspond to a portion of the display captured by the second frustum. A network card may be communicatively coupled to the first GPU, the second GPU, and the one or more processors. The network card may be configured to access a memory of the first GPU to retrieve the first image for the one or more processors and to access a memory of the second GPU to retrieve the second image for the one or more processors. Transferring the first image from the memory of the first GPU to the one or more processors need not require intermediate copies of the first image to be made by the network card. A framebuffer storing the composite image may be converted into broadcast packets. The broadcast packets may be transmitted from the framebuffer to the display in the immersive environment. Transmitting the broadcast packets from the framebuffer to the display in the immersive environment need not require transforming the broadcast packets into a video format.

BRIEF DESCRIPTION OF THE DRAWINGS

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Figure 1:
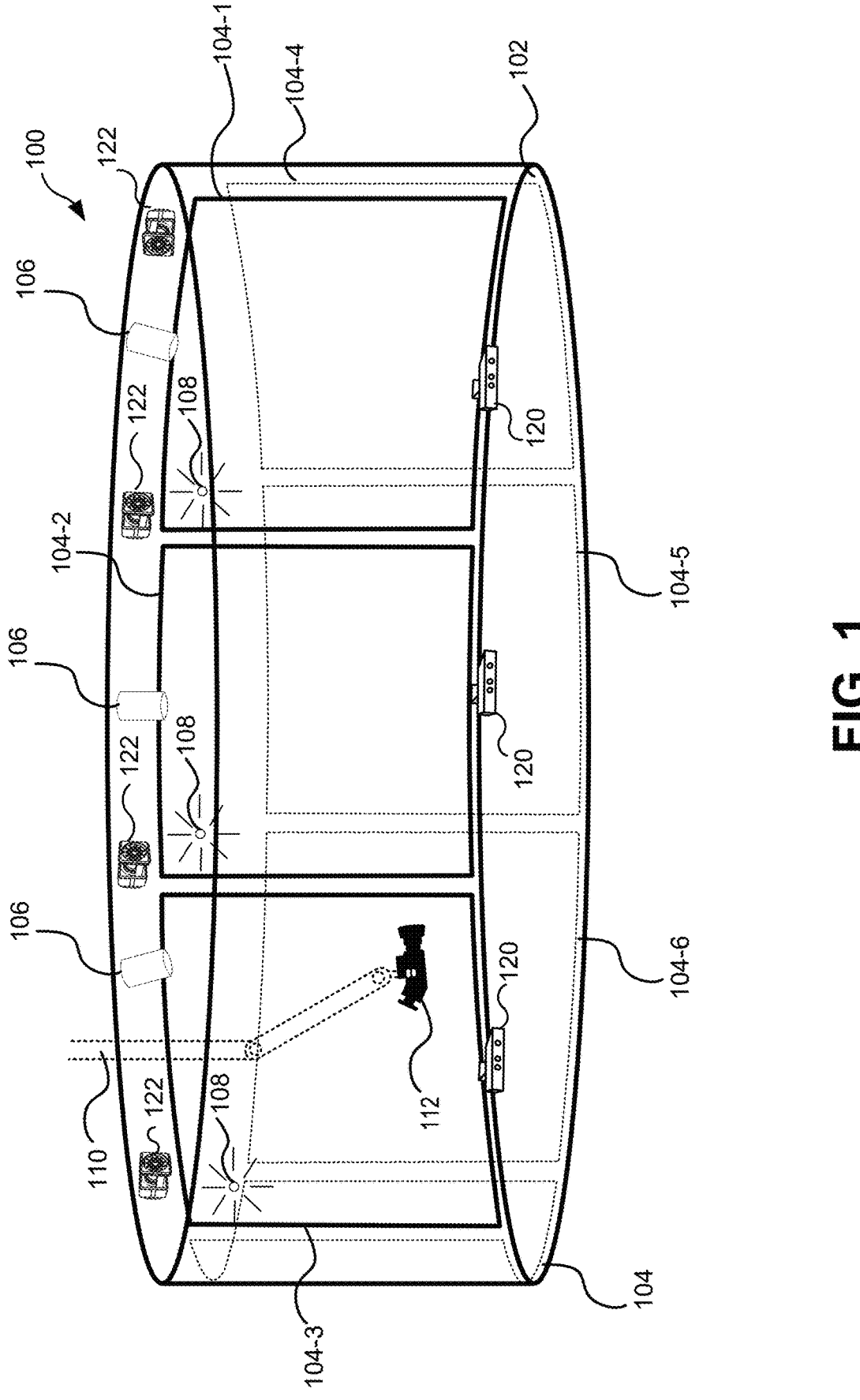
FIG. 1 illustrates an immersive content production system according to some embodiments of the invention.

Embodiments described herein disclose an immersive content production system that includes a plurality of displays. Immersive content (e.g., virtual reality content, mixed reality content, augmented reality content, content configured for display in immersive caves/walls, etc.) may be leveraged as part of a system used by users (e.g., artists, engineers, technicians, directors, and other individuals involved in content production) in order to generate content (e.g., movies, television programming, online or streamed videos, etc.). As described herein, the immersive content production system may also be referred to as simply the content production system or the production system.

In one aspect, the immersive content production system presents images in real-time or at interactive frame rates (e.g., 24, 30, 60, 120, or 240 frames per second) to users of the immersive content production system. The images may be presented over immersive devices (e.g., virtual reality goggles and augmented reality glasses) or via an immersive environment, such as an immersive "cave" or one or more immersive "walls" (e.g., a performance area partially or completely surround with image displays). In one embodiment, the immersive environment may include a performance area, such as a stage. The performance area may be partially or completely surrounded by light emitting diode (LED) or liquid crystal display (LCD) display screens. For example, the performance area may include one or more walls and a ceiling of LED display screens enclosing or surrounding the performance area. Alternatively, the performance area may be partially or completely surrounded by projector screens. A set of projectors may additionally be configured to generate images on the projector screens. In some embodiments, the performance area may be partially or completely surrounded by a combination of LED or LCD display screens and projector screens. In some embodiments, the content production system may obtain virtual environment content and display the content on the image displays around the performance area. In this way, a performer/actor in the performance area may appear to be within the virtual environment. In some embodiments, the images displayed by the images displays are primarily scenery content (e.g., trees, buildings, the sun, etc.).

In some embodiments, the content production system may include one or more cameras usable for capturing a performance being performed by a performer in the performance area. The performance area may be, for example, a movie/television set, stage, stadium, park, etc. During the performance, the content production system may detect the motion and/or positioning of the performer. Such detection may be based on markers or sensors worn by the performer, depth and/or other motion detection sensors of the content production system (e.g., light detection and ranging (LIDAR)), motion capture cameras, etc. For example, an array of depth sensors may be positioned in proximity to and directed at the performance area. For instance, the depth sensors may surround the perimeter of the performance area. In some embodiments, the depth sensors measure the depth of different parts of the performer in the performance area over the duration of a performance. The depth information may then be stored and used by the content production system to determine the positioning of the performer over the performance.

In certain embodiments, a taking camera can be aimed at the performance area and may capture the performance of the performer as well as the virtual environment displayed by the image displays (e.g., LED displays) behind the performer. In some embodiments, sensors may be used to determine the position and orientation of the taking camera during a performance. For example, Global Navigation Satellite System (GNSS) based sensors may be attached to the taking camera to determine its position within or relative to the performance area. As another example, other cameras may be directed at the taking camera configured to capture the performance. One or more markers may be attached to the taking camera. During a performance, the other cameras may capture images of the taking camera as the taking camera is moved and/or oriented during the performance. The production system may use the images captured of the taking camera to determine the movement and orientation of the taking camera during the performance. Such information may be used to support the content production process. For example, such information regarding the orientation and movement of the taking camera may be used to determine the distance of the taking camera from the performer over a performance. Based on the orientation and movement (and other attributes such as lens aperture and focal length) of the taking camera, the content production system may adjust the virtual environment displayed by the immersive cave or walls in real-time or at interactive frame rates to correspond to the orientation and position of the taking camera. In this way, images of the virtual environment can be perspective-correct over a performance of the performer.

FIG. 1 is a simplified illustration of an immersive content production system 100 according to some embodiments. The immersive content production system 100 can include a performance area 102 that is partially or completely surrounded by image displays 104 (also referred to herein as just "displays"). The immersive content production system 100 can obtain virtual content and display the virtual content on the displays 104.

The performance area 102 can be, for example, a movie or television set, a stage, a stadium, a park, or the like. In one aspect, the immersive content production system 100 presents images in real-time or at interactive frame rates to users of the immersive content production system 100 (e.g., performers within the performance area 102). Since the displays 104 surround or partially surround the performance area 102, the immersive content production system 100 can create an immersive environment (also referred to as an immersive "cave" or immersive "walls") for performances that take place within the performance area 102. In this way, an actor or actress performing within the performance area 102 can appear to be in a virtual environment.

In some embodiments, the displays 104 can include light emitting diode (LED) display screens or liquid crystal display (LCD) display screens. For example, the performance area 102 can include one or more walls of LED or LCD displays 104 enclosing the performance area 102. Alternatively, the performance area 102 can be partially or completely surrounded by projector screens. A set of projectors can be configured to project images on the projector screens. In some embodiments, the performance area 102 can be surrounded by a combination of LED display screens, LCD display screens, and/or projector screens.

According to various embodiments, the displays 104 can have various sizes, and the performance area 102 can also have various sizes. In some embodiments the displays 104 can be 20-40 feet tall, and the performance area 102 can be, for example, between 50-100 feet in diameter. In some embodiments, the displays 104 can include multiple displays 104 that are generally fixed in position and mostly surround the performance area 102, along with additional moveable or mobile displays 104 that can be moved into positions that create an immersive environment that extends completely or almost completely (i.e., 300-360 degrees) around the performance area 102. As an example, in one embodiment, fixed position displays 104 can extend approximately 270 degrees around the performance area 102, while moveable displays 104 can be used to augment the fixed position displays to further extend the immersive environment up to 320 degrees or up to 360 degrees around the performance area. Additionally, while not shown in FIG. 1, in some embodiments, the immersive content production system 100 can further include one or more displays 104 as a ceiling on the performance area 102 and/or as part of the floor of the performance area 102. Also, while for ease of illustration, the displays 104 are shown in FIG. 1 as having a small space or gap 105 between adjacent displays 104, the displays 104 can be installed so as to be seamless, with less than a threshold distance or even no space between adjacent displays 104. In some instances, the displays 104 may be curved.

A taking camera 112 can be attached to a rig 110 and can be aimed at the performance area 102 to capture the performance of a performer as well as the virtual environment displayed on the displays 104. In some embodiments, sensors can be used to determine the position and orientation of the taking camera 112 during a performance. For example, GPS based sensors (not shown) can be attached to the taking camera 112 to determine its position within or relative to the performance area 102. In some embodiments, there may be multiple taking cameras 112 capturing the performance from different positions.

In some embodiments, other cameras (e.g., motion capture, and/or alignment cameras 122 discussed below) can be directed at the taking camera 112 and/or configured to capture the performance. One or more markers can be attached to the taking camera 112. During a performance, the other cameras can capture images of the taking camera 112 as the taking camera 112 is moved and oriented during the performance. The immersive content production system 100 can use the captured images of the taking camera 112 to determine the movement and orientation of the taking camera 112 during the performance. Such information can be used to support the content production process. For example, such information regarding the orientation and movement of the taking camera 112 can be used to determine the distance of the taking camera 112 from a performer over a performance. Based on the orientation and the movement (as well as other intrinsic attributes such as lens aperture and focal length) of the taking camera 112, the immersive content production system 100 can adjust the virtual environment displayed by the immersive cave or walls in real-time or at interactive frame rates to correspond to the orientation and the position of the taking camera 112. In this way, images of the virtual environment can be made perspective-correct with respect to the performance of the performer.

In some embodiments, the immersive cave or walls can include one or more lighting elements to provide lighting for performance area 102. For example, the immersive cave or walls can include supplemental LED lights 106 separate from the displays 104 that can light the performance area 102 (including the performer) and create various desired lighting effects. Thus, the LED lights 106 can have the ability to project lighting levels of different intensities and project such light from different locations around the stage. In some embodiments the additional LED lights 106 can be controlled during a performance in order to change the intensity of the lighting of performance area 102 (including the performer).

In some embodiments, the immersive content production system 100 may further include one or more depth sensors 120 and/or one or more alignment cameras 122. The alignment cameras 122, also referred to as motion cameras, can capture motion in the performance area 102. During a performance, the immersive content production system 100 can detect the motion and/or the positions and the orientations of the performers within the performance area 102. The detection can be based on markers or sensors worn by a performer, as well as by the depth sensors 120 and/or by the alignment cameras 122. For example, an array of depth sensors 120 can be positioned in proximity to and directed at the performance area 102. For instance, the depth sensors 120 can surround the perimeter of the performance area. In some embodiments, the depth sensors 120 can measure the depth of different parts of a performer in the performance area 102 over the duration of a performance. The depth information can then be stored and used by the immersive content production system 100 to determine the positions of the performer over the course of the performance.

The depth sensors 120 can include a motion-sensing input device. The depth sensor 120 can include a monochrome complementary metal-oxide semiconductor (CMOS) sensor and an infrared projector. The infrared projector can project infrared light throughout the first performance area 102, and the CMOS sensor can measure the distance of each point of reflected infrared (IR) radiation in the performance area 102 by measuring a time it takes for the emitted infrared light to return to the CMOS sensor. Software in the depth sensors 120 can process the IR information received from the depth sensor 120 and use an artificial intelligence machine-learning algorithm to map the visual data and create three-dimensional (3-D) depth models of solid objects in the performance area 102. For example, the one or more depth sensors 120 can receive emitted infrared radiation to generate 3-D depth models of a performer, along with the floor, walls, and/or ceiling of the performance area 102. In one test embodiment, the performance area 102 was surrounded by six to eight Kinect® cameras to capture depth information of objects and performers in the performance area 102.

The alignment cameras 122 can be part of a motion capture system that can track the movement of performers or objects within the immersive content production system 100. The alignment cameras 122 can be used to support alignment of virtual assets and physical assets, as described in more detail below. In some instances, the alignment cameras 122 can be used to track the movement of the taking camera 112 and provide a location of the taking camera to the immersive content production system 100. The immersive content production system 100 can use this information to determine what portion of the displays 104 is to be rendered from the tracked position and the perspective of the taking camera 112.

Figure 2:
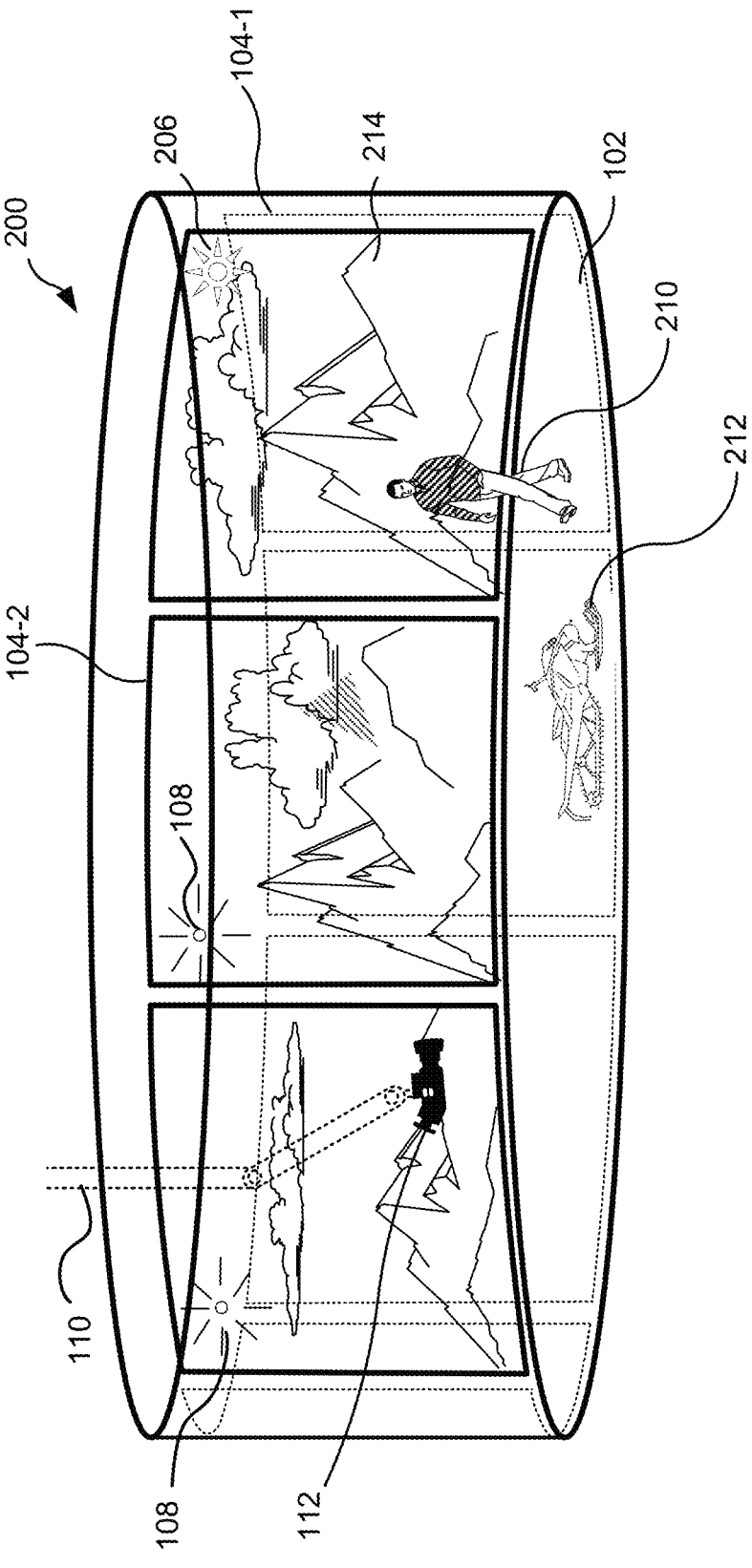
FIG. 2 illustrates an immersive content production system according to some embodiments of the invention with a performer on the stage and scenery depicted on the image displays.

FIG. 2 is a simplified illustration of an immersive content production system 200 according to some embodiments. The immersive content production system 200 can be similar to the immersive content production system 100, and thus includes many or all of the same components as described with respect to FIG. 1. As shown in FIG. 2, the immersive content production system 200 can include the performance area 102, the displays 104, the simulated lights 108, and the taking camera 112 attached to the rig 110.

In FIG. 2, a performer 210 is also shown within the performance area 102. The performance area 102 can include one or more physical props 212 (e.g., the snowmobile depicted in FIG. 2). Scenery images 214 of a virtual environment can be presented on the displays 104 to generate the immersive environment in which the performer 210 can conduct his or her performance (e.g., act out a scene in a movie being produced). In some embodiments, the scenery images 214 can be seamlessly presented across several displays 104 as described with respect to FIG. 1. The scenery images 214 can include one or more virtual light sources 206 that can be, for example, an image of a sun, a moon, stars, street lights, or other natural or manmade light sources displayed in the scenery images 214.

The scenery images 214 can also provide a background for the video content captured by the taking camera 112 (e.g., a visible light camera). The taking camera 112 can capture a view of performance area 202 from a certain perspective. In some embodiments, the taking camera 112 can be stationary, while in some other embodiments, the taking camera 112 can be mounted to a track 110 that can move the taking camera 112 during a performance.

Embodiments of the invention can generate and display perspective-correct images (as rendered from the tracked position and perspective of taking camera 112) onto portions of the surrounding image display walls that are within the field of view (i.e., the frustum) of the taking camera. Areas of the displays 104 outside the field of view of taking camera 112 can be displayed according to a global view perspective.

Figure 3:
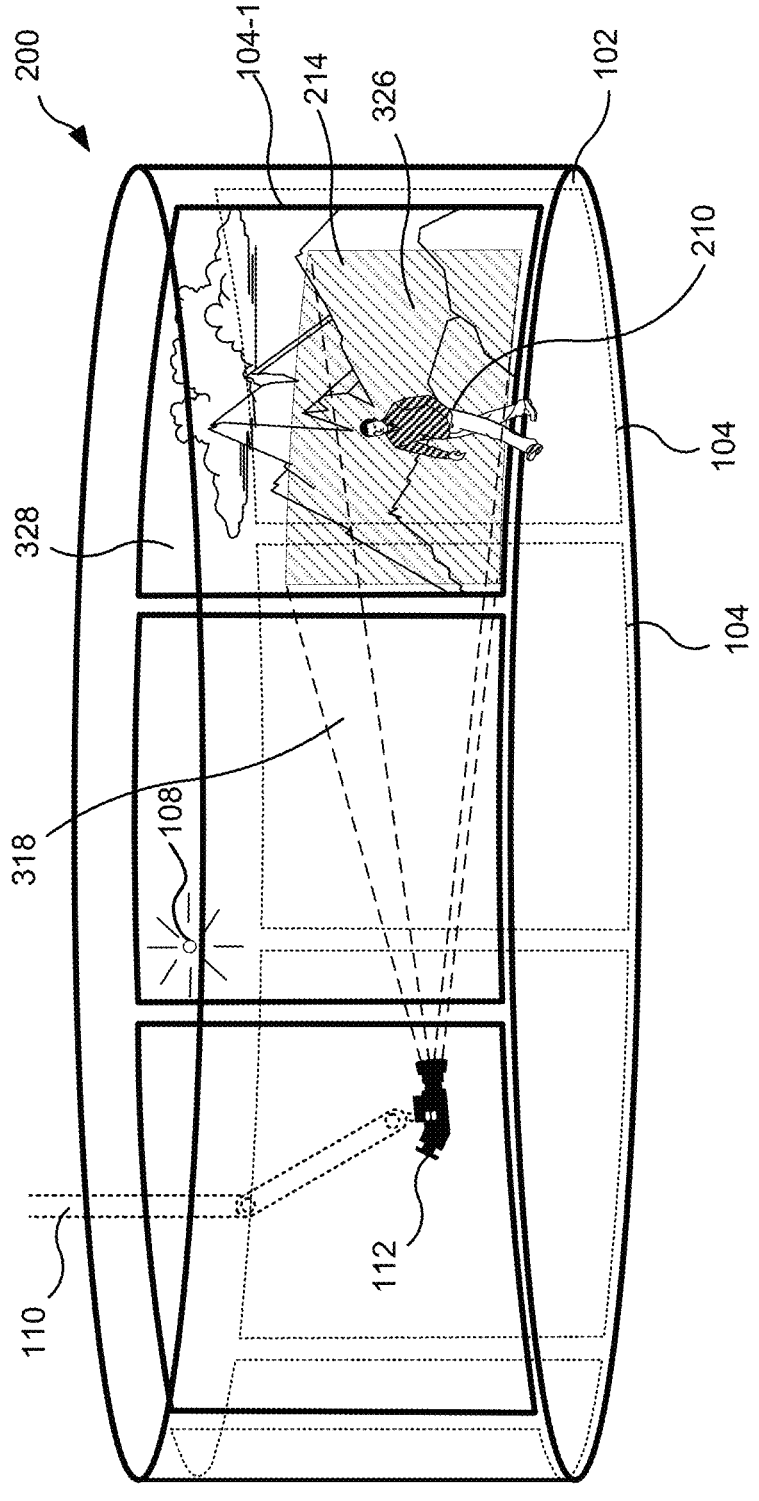
FIG. 3 illustrates an example of the frustum of a taking camera within the immersive content production system shown in FIG. 2.
Figure 4:
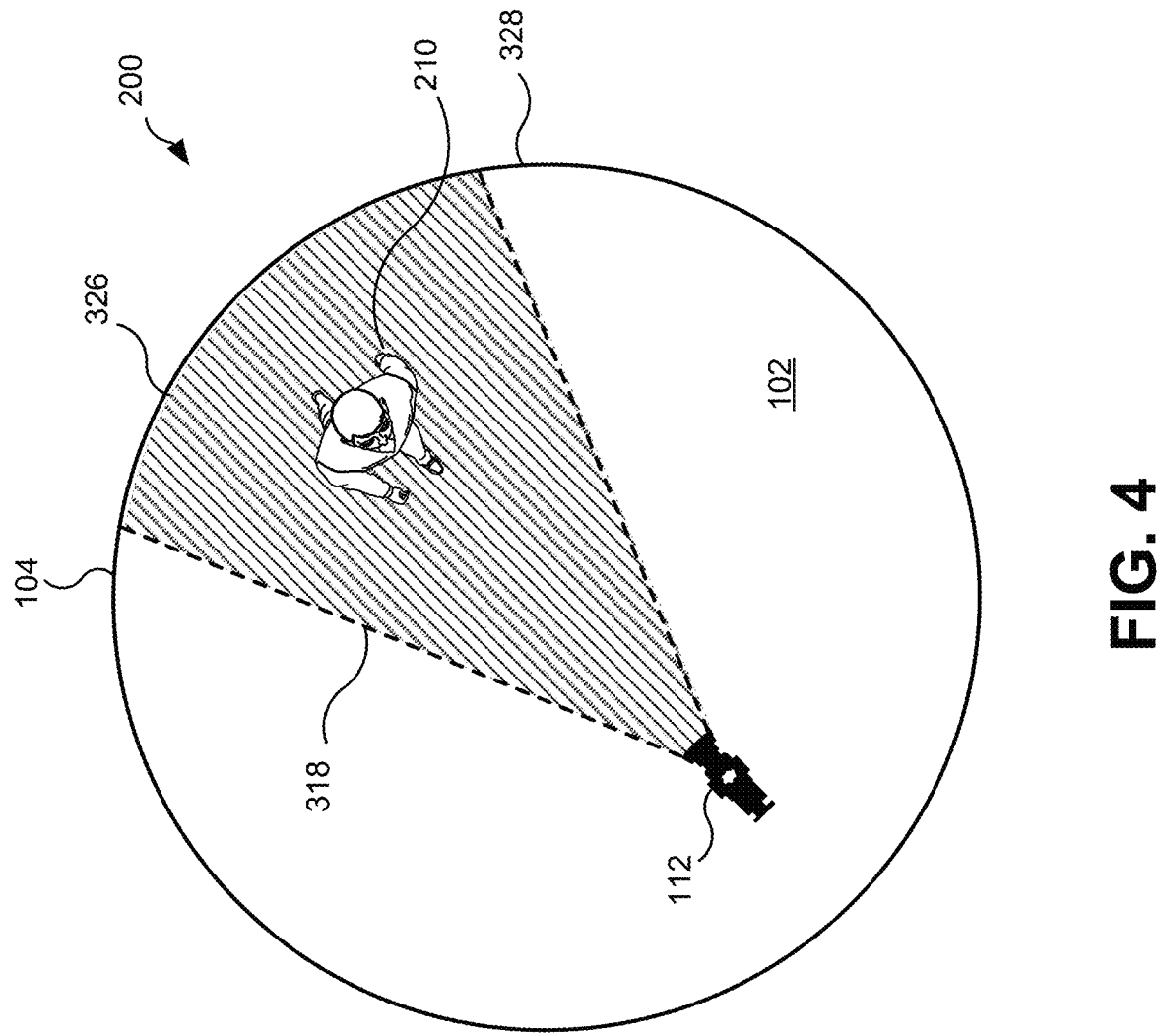
FIG. 4 is a simplified illustration of the immersive content production system shown in FIG. 3 depicting the frustum of the taking camera from a top view.

FIG. 3 illustrates the immersive environment production system 200 from FIG. 2 with a frustum 318 of a taking camera 112, according to some embodiments. FIG. 4 illustrates a top view of the production system 200, according to some embodiments. The frustum 318 of taking camera 112 within the content production system 200 may include displays 104 that at least partially encircle a performance area 102 of a performer 210. Scenery images 214 of a virtual scene can appear on the one or more displays 104. The scenery images may include any suitable image, such as mountains, trees, desert landscapes, oceans, a sky, a sun, buildings, spaceships, background characters, etc. In certain embodiments, the scenery images may not be static. For example, background characters in the scenery images may be animated. The scenery images may include artificial light sources that shine on the performer 210. For example, FIG. 3 illustrates how the performer 210 may be entirely encircled by the displays 104 of the production system 200. In combination, the one or more displays 104 may provide a realistic environment from the view of the performer 210. The one or more displays 104 may also provide a realistic view of the performer 210 in the environment from the perspective of the taking camera 112. For example, artificial light sources displayed in the one or more displays 104 may light the performer 210 as if the performer 210 were actually in a real-world set or environment.

For three-dimensional (3D) graphics, the frustum of a camera, also known as a viewing frustum, can be the region of space in the virtual modeled world that would appear on video taken from the taking camera 112. Thus, the frustum 318 may represent the field of view of the taking camera 112. The exact shape of viewing frustum 318 can vary and will depend on the lens of taking camera 112 and other factors, but typically the frustum 318 may be approximately a rectangular pyramid or similar shape. In some embodiments, there may be multiple taking cameras 112 that are positioned at different locations and orientations in proximity to the performance area 102. Each taking camera 112 may be associated with a different viewing frustum.

Generally, the scenery images 214 may be rendered as general background images to be displayed on the display devices 104. In some embodiments, the general background images may be rendered and displayed without reference to the position of the taking camera 112. In some embodiments, these background images may be rendered and displayed with reference to the position of the performer 210. Alternatively, these background images may be rendered and displayed without reference to the position of the performer 210. However, these background images may include artificial light (e.g., light 108) and other environmental effects that are reflected by, or incident upon, the performer 210. For example, an artificial sun may be displayed on a screen that is opposite of the performer 210, and the light from the artificial sun may light the performer in a realistic fashion for the taking camera 112. In some cases, the background images may also include interactive scene elements that may benefit the performance of the performer 210. For example, the background images may include other CGI characters, scenery, objects, and so forth, that allow the performer 210 to provide a realistic and live performance for the taking camera 112.

In order to capture realistic images of the performer 210 with the taking camera 112, the scenery images 214 displayed as a background to the performer 210 within the view of the frustum 318 may be rendered based on the location of the taking camera 112. As described above, the rig 110 may move the position and/or orientation of the taking camera 112 in order to capture the performer 210 as the performer 210 moves throughout the immersive environment. For example, the motion capture cameras or depth sensors may track the bounding box 430 of the performer 210 and move the camera 112 in real time as the performer 210 moves. Therefore, an area 326 captured by the view of the taking camera 112 may change continuously during the shoot. Thus, the system may use the position and/or orientation of the taking camera 112 to determine in real time an area 326 that is captured by the frustum 318. Therefore, location and size of the area 326 may also change continuously throughout the shoot.

In creating the immersive environment presented on displays 104, immersive content production system 200 can render the portion within the frustum of the taking camera differently than it renders the portion outside the frustum of the taking camera. For example, embodiments of the invention can render the portion 326 of the displays 104 that corresponds to frustum 318 as perspective-correct images that can update based on movement of the taking camera 112. For example, taking camera 112 can move during a performance as performer 210 moves or to capture the performer from a different angle. As the taking camera 112 moves, portions of the scenery images 214 within the viewing frustum 318 can be updated in accordance with the perspective of the camera. Portion 328 of the displays 104 outside of the frustum 318 can be rendered from a global view perspective and thus display relatively static images that do not change based on the movement of the taking camera.

In some embodiments, the images inside the frustum of the taking camera 112 can be at a higher resolution than the images outside the frustum. In some embodiments, the images displayed outside the frustum of the camera can be relatively basic scenery images (e.g., blue sky, green grass, gray sea, or brown dirt.) In some instances the scenery images can be completely static. In other instances the scenery images 214 can dynamically change over time providing a more realistic background for the performance in the immersive environment 200. For example, clouds can move slowly across the displays 104, branches of trees can blow in the wind, etc. to create realistic, life-like effects. Further, the scenery images 214 can dynamically change over time to represent changes in the environment over time.

If the entirety of scenery 214 is rendered from the tracked position and perspective of the taking camera 112 to present perspective-correct images across the entirety of surrounding displays 104, in some instances view-dependent lighting artifacts will be present on the physical foreground components within the performance area 102 (e.g., the performers/actors, props, and physical set decorations). As the taking camera 112 moves, the rendered images on the displays 104 update, which can result in a visual discrepancy between the static physical set in the performance area 102 and the virtual assets of the virtual environment rendered by displays 104 on the walls. As a result, light sources (e.g., virtual sun 206) within the virtual environment might appear to move across the performers 210, across the props 212, and/or across various set decorations, just because the taking camera 112 is physically moving. Thus, it might appear that virtual sun 206 moves relative to a performer based on movement of the taking camera when in fact the position of virtual sun 206 relative to the performer should not change.

Figure 5:
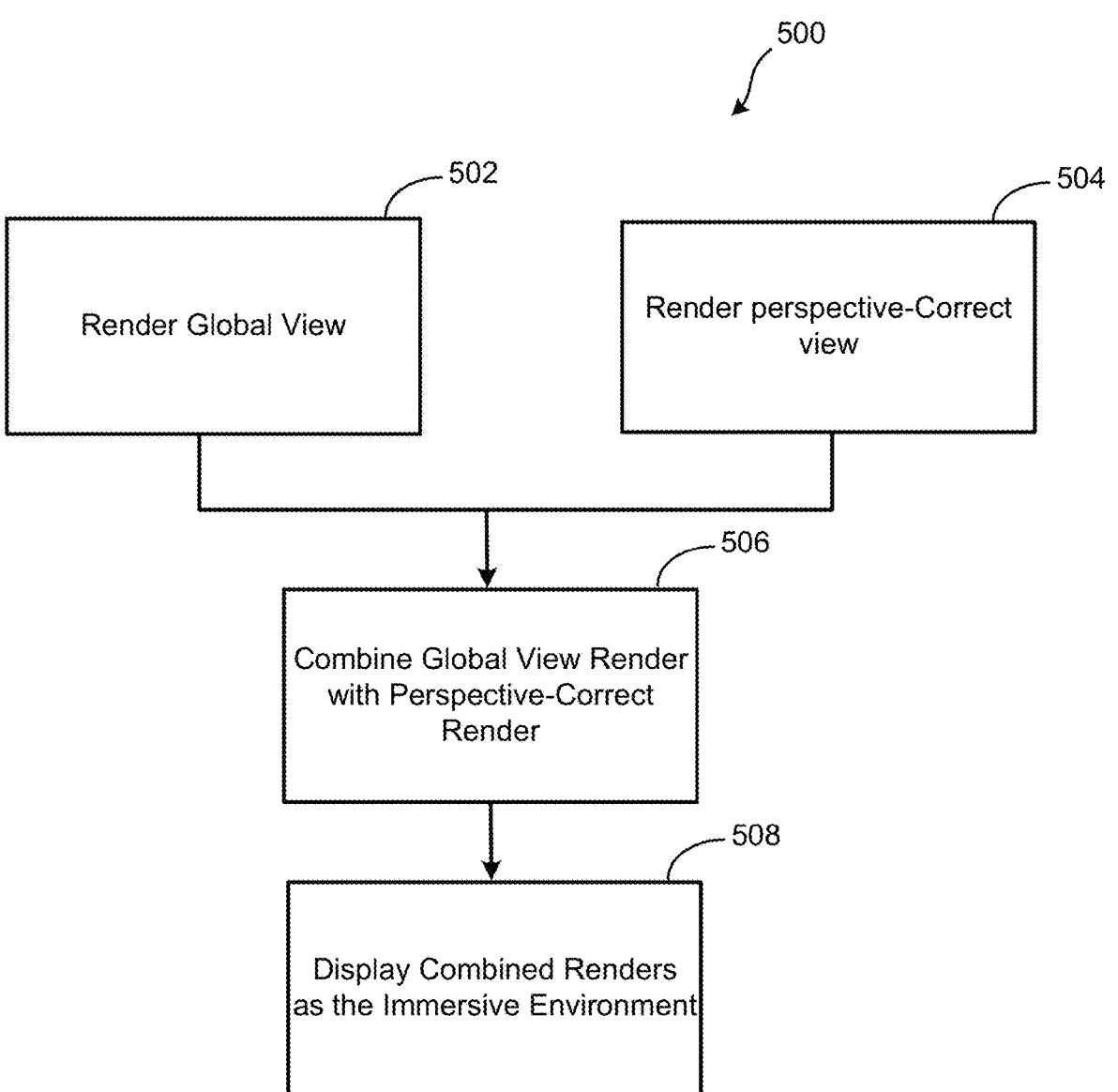
FIG. 5 illustrates a flow diagram for an exemplary method of rendering images using an immersive content production system.

To mitigate this visual artifact, two separate renderings can be performed in some instances by the content production system of embodiments of the invention when display-ing a virtual environment. FIG. 5 illustrates a flowchart 500 depicting a method of rendering content onto the displays 104 according to some embodiments of the invention, the two renderings can be performed simultaneously and in real-time. In one rendering (block 502), a global view of the virtual environment (including any virtual assets) is ren-dered independent from the perspective of the taking cam-era. The global view can include background or scenery images that create much of the virtual or immersive envi-ronment that provides context for the one or more perform-ers on stage 102. The global view can also include lighting effects produced from displays outside the frustum of the taking camera 112. Depending on the size of frustum 318, this global view rendering can be displayed on the majority of the display area within the virtual environment.

Block 502 can render the global view from a virtual spherical camera placed at a virtual location within the virtual environment based on predefined criteria. In some embodiments, the placement of the virtual spherical camera can be based on a threshold error value for the lighting of virtual objects within the virtual environment and/or lighting of the physical objects in the performance area. The thresh-old error value can indicate a minimal acceptable level of visual inaccuracy of the lighting of the objects within the virtual environment and/or performance area. In some embodiments, the images of the virtual environment ren-dered by in the global-view rendering can remain com-pletely static. In other words, objects within the virtual environment might not move or change in location on the displays 104 over time or during a performance. In other embodiments, objects within the global-view of the virtual environment are not completely static but simply do not update in response to movement of the taking camera 112. Images of the virtual environment generated during the global-view rendering can be used for lighting and reflection purposes onto the physical foreground/performance area.

In another rendering (block 504), a portion of the virtual environment is rendered from the location and perspective of the taking camera. The perspective-correct rendering can be completely independent from the global-view render and can include performers, props and background scenery within the frustum (e.g., frustum 318) of the taking camera 112. The perspective-correct rendering (block 504) repre-sents a portion of the virtual environment and can thought of as a patch that can be displayed on a portion of displays 104. As the global view can be captured by a virtual spherical camera, discrepancies can exist for images displayed on the displays in the background from the spherical camera as compared with images that captured within the frustum of the taking camera. Therefore, a patch can be created to correct the images in the background displays that appear within the frustum of the taking camera. In this way as the taking camera captures the one or more images with actors, props, and background, the background appears to be per-spective-correct and do not move abnormally due to move-ment of the taking camera.

Embodiments of the invention can combine the patch from the perspective-correct rendering with the global-view render (block 506) to present the virtual environment on the content production system without (or with fewer) undesir-able lighting effects (block 508). For example, images of the virtual environment can be generated onto displays 104 and updated over the course of a performance so that the perspective of the virtual environment displayed compen-sates for corresponding changes to the positioning and orientation of the taking camera 112. In some embodiments, rendered content is combined (block 506) such that the displays 104 display (block 508) the perspective-correct rendering in the portion of the displays 104 that is viewable by the frustum 318 of the taking camera 112 and the portions of the displays 104 outside of the frustum 318 of the taking camera 112 only include the rendered images from the global-view render.

Content can be presented and continuously updated on the displays 104 in the manner set forth in FIG. 5 throughout the duration of a performance. As the position of the taking camera 112 changes during the performance (or as other factors that alter the field of view of the taking camera, such as the focal length of the lens, change), the area 326 that is rendered from the perspective and location of the taking camera during the performance (block 504) will change.

In some embodiments the immersive content generated in block 506 and displayed in block 508 can be done so at a frame rate that matches the frame rate of taking camera 112, such as 48, 72 or 96 frames per second or other suitable frame rates compatible with the taking camera. And, as immersive content is presented and updated on the displays, taking camera 112 can film the performance at the frame rate generating video of one or more performers and/or props on the stage with the immersive content generated in block 506 and displayed per block 508 in the background. The gener-ated video can then be used, and edited in some embodi-ments, to create new content, such as movies, television programming, online or streamed videos, etc.

As discussed, above the virtual environment can remain static for images of the global-view render. Limiting the perspective correct imagery to the frustum 318 of the camera 112 minimizes lighting and reflection artifacts from shifting perspectives as the camera 112 position changes during a performance. In some instances, as the taking camera 112 moves, different portions of the displays 104 will fall within the frustum 318 of the taking camera 112. As such, a particular portion of the displays 104 may display images rendered from the global-view or images rendered from the perspective-correct view depending on the position and orientation of the taking camera 112 at a given point during a performance.

Some embodiments of the invention combine the camera-perspective and global view renderings (block 506) using a technique that blurs or blends the edges of the patch gen-erated in block 502 with the surrounding content generated in block 504. For example, in some embodiments block 504 renders a perspective-correct patch that is slightly larger than (i.e., over scanned) area 326. In block 506, embodi-ments of the invention replace the entirety of the global-view render that corresponds to area 326 with the patch generated in block 504 and a soft blending technique is used to combine content from the portion of the patch that is over-sized and overlaps with the global-view render in the overlapping area of the displays 104. Such a soft blending technique can reduce or eliminate visible discontinuities between the patch in area 326 generated from the perspec-tive-correct render and images of the virtual environment surrounding the patch generated from the global-view render when the combined content is presented on displays 104 (block 508). Such a soft blending technique can result in having the edges of area 326 "fuzzy" to obfuscate differ-ences between the images depicted in the patch and the images presented outside the patch. This technique can mitigate artifacts due to latency of camera tracking. For example, in some embodiments the frequency at which the system gets updates of the taking camera's position and orientation can run behind the rate at which the system can render digital content to displays 104. In such embodiments, operators can control the amount of over scanning. In other embodiments, a second camera can be used to fill in the over scanned areas.

Figure 6:
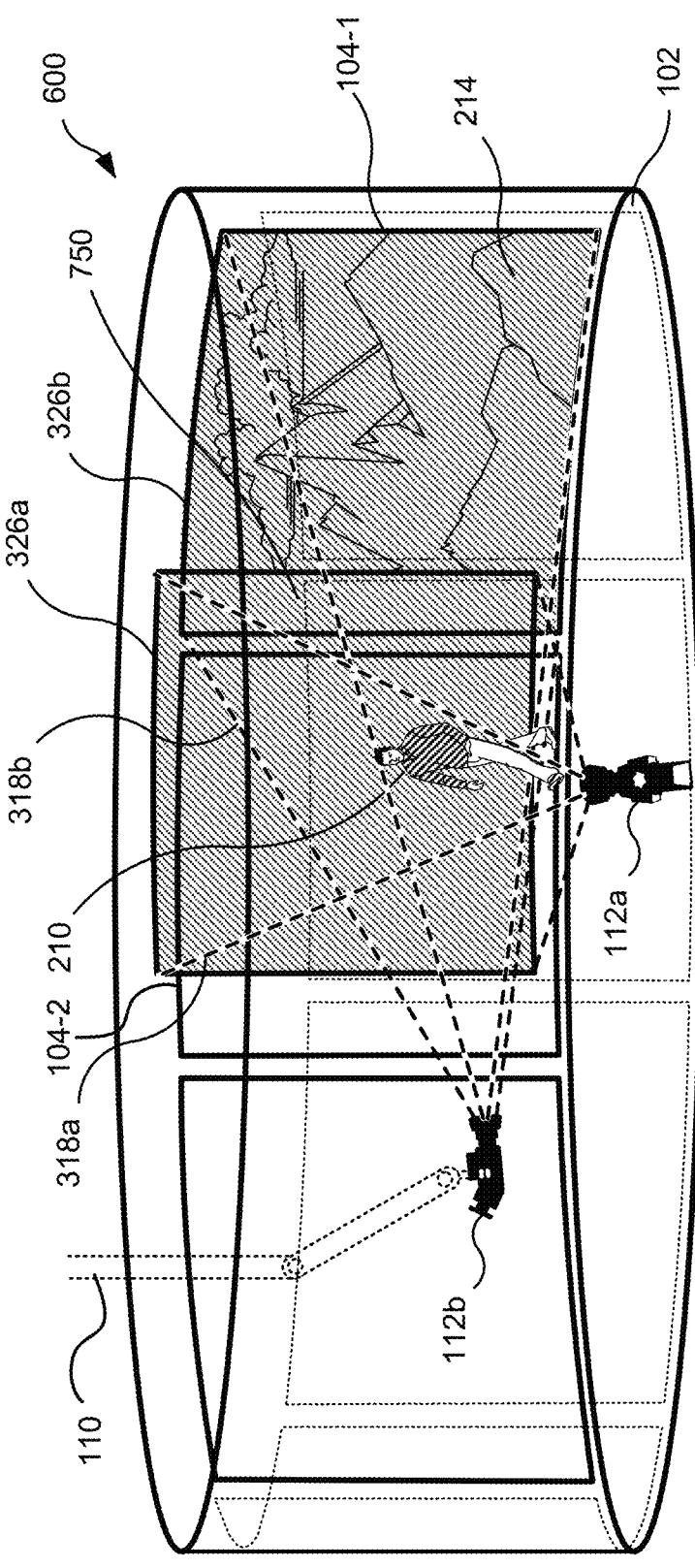
FIG. 6 illustrates an exemplary embodiment of an immersive content production system according to some embodiments of the invention that includes multiple taking cameras.
Figure 7:
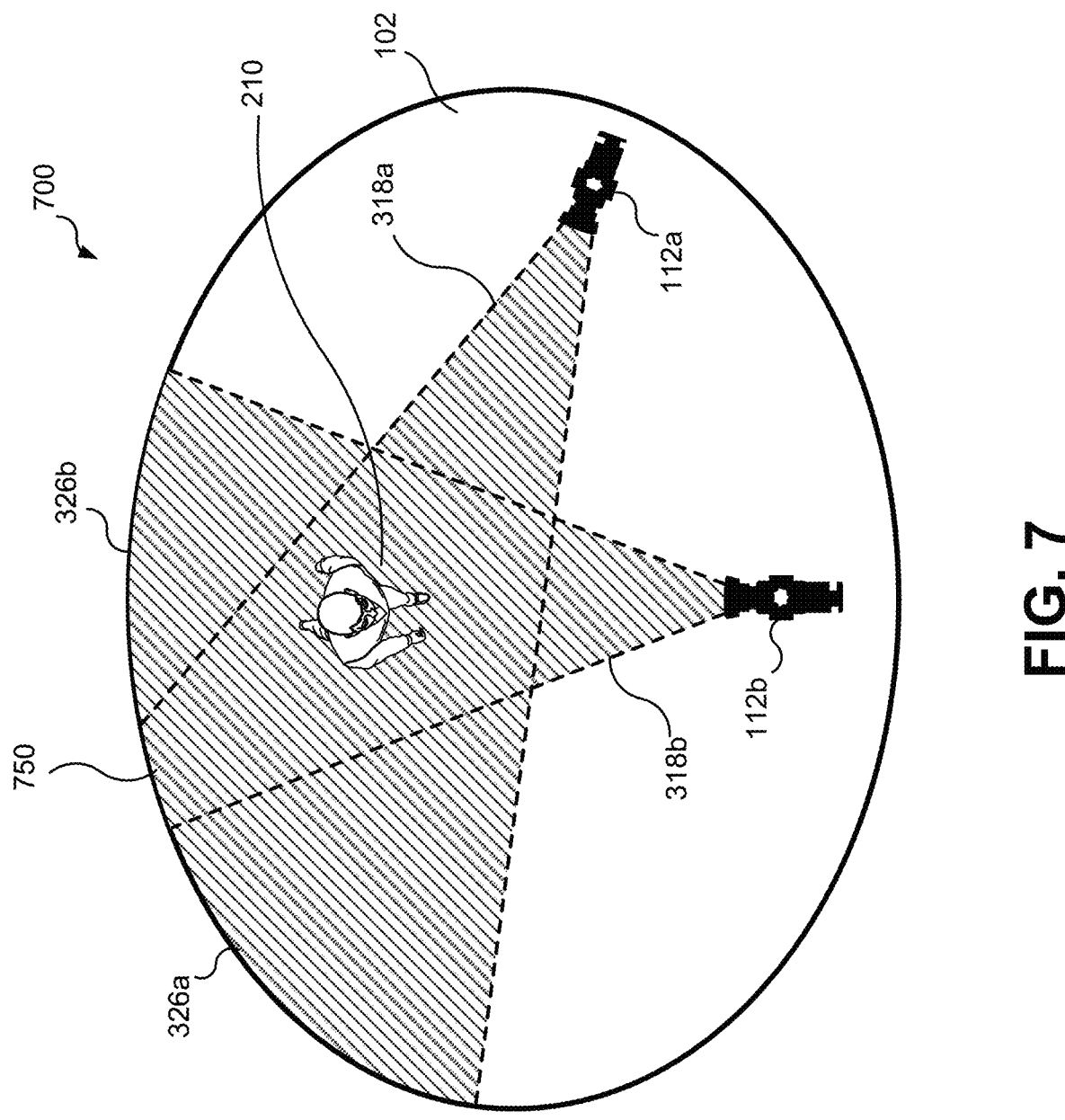
FIG. 7 is a simplified illustration of the immersive content production system shown in FIG. 6 depicting the frustums of the multiple taking camera from a top view.

Some embodiments of the invention include multiple taking cameras. FIG. 6 illustrates an example embodiment of an immersive content production system 700 that includes two taking cameras 112a and 112b and FIG. 7 is a simplified top view of production system 700. FIGS. 6 and 7 depict a performer 210 in a performance area 102 surrounded at least partially by multiple displays 104 that display scenery images 214 to be captured by the multiple taking cameras. The multiple taking cameras (shown as a first taking camera 112a and a second taking camera 112b) can be directed at a performance area 102 (including the virtual environment presented on the displays 104 (e.g., the LED or LCD display walls) to concurrently capture images. Although only one performer 210 is depicted in the performance area 102 in FIG. 6, multiple performers can be within the performance area as well as multiple props and set decorations.

The taking cameras 112a, 112b can be pointed in different directions and have different fields of views. For example, taking camera 112a can have a field of view defined by frustum 318a while taking camera 112b can have a field of view defined by frustum 318b. Thus, each taking camera 112a, 112b can capture a different portion of the immersive environment presented on displays 104. For example, taking camera 112a can capture portion 326a while taking camera 112b can capture portion 326b.

In some instances the fields of view of the multiple taking cameras will overlap as indicated by region 750 shown in each of FIGS. 6 and 7. Since the perspective-correct renderings of the multiple cameras can be different in the overlapping regions, embodiments of the invention can interleave the cameras and the perspective-correct renderings for each camera in order to isolate the camera feeds from each other. For example, in a scenario with two taking cameras 112a, 112b in which each camera has a frame rate of 60 fps, camera 112a can be set to capture images on the even frames while camera 112b can be set to capture images on the odd frames. Content production system 700 can be synchronized with the cameras such that it generates and displays content for the area 326a when taking camera 112a is capturing images and generates and displays content for area 326b when taking camera 112b is capturing images. Interleaving the perspective-correct content in this manner ensures that each taking camera is capturing images with a background from scenery 214 that matches the perspective of the camera even in the areas 750 where the cameras have overlapping fields of view.

It can also be beneficial to interleave the immersive content generated for each camera's field of view in scenarios where two taking cameras (e.g., camera 112a and camera 112b) face each other in opposing directions and do not have overlapping fields of view. Such a scenario can occur, for example, during a complicated action scenes (e.g., a fight scene) in which multiple cameras would be used to capture as much video as possible in a single take. In this scenario, even though the multiple cameras might not have overlapping fields of view, the display lighting from outside the frustum of camera 112a can pollute images being taken for camera 112b. Similarly, the display lighting from outside the frustum of camera 112b can pollute the images being taken for camera 112a. Accordingly, interleaving the immersive content generated for each camera's field of view as described above can be used to resolve the light pollution for each of the taking cameras.

As illustrated in the figures above, the image that is rendered and displayed on the display 104-1 may include at least two different images that are composited together when displayed. For example, an portion 328 that is not captured by the frustum 318 of the taking camera 112 may be rendered using the normal background images (e.g., the scenery images 214) without respect to the taking camera 112. Additionally, the portion 326 may be rendered with alternative images and skewed or otherwise adjusted as described above with respect to the position and/or orientation of the taking camera 112. Thus, at least three operations may be used to generate the final image displayed on the display 104-1. These operations may include a first render operation that is specific to the view of the taking camera 112 and the frustum 318 for portion 326. The operations may include a second render operation that renders the background image on the display 104-1 for portion 328. Note that the second render operation may render the background image for the entire area of the display 104-1, not just the portion 328. The operations may also include a compositing operation that composites the background image for the display 104-1 with the portion 326 visible in the frustum 318. This compositing image may then be displayed in real time as a video sequence at interactive frame rates on the display 104-1. Note that the compositing operation may layer the rendered image for the area 326 on top of the background to leave the area 328 visible as background scenery.

The rendering and compositing operations described above may be typically performed on a single workstation or computer system sequentially. In the example of FIG. 6, a display 104-1 would be associated with a computer system dedicated to performing the rendering and compositing operations for the final image that is displayed on the display 104-1. The computer system may have a Graphic Processing Unit (GPU) that performs the rendering and compositing operations. However, these rendering operations typically require a great deal of processing time and memory. For example, the computer system associated with the display 104-1 may need to render three complete images. A first image to be rendered may be associated with a first camera 112b to generate a perspective-correct image based on the location of the first camera 112b. This first image may be a higher-resolution image than the background images visible on other displays. A second image to be rendered may be a background image that fills the display 104-1. This background image need not be rendered based on the location of any of the cameras, but rather may be a general background image as described above. A third image to be rendered may be associated with a second camera 112a to generate a perspective-correct image based on the location of the second camera 112a. These three images would normally be rendered by the GPU associated with the corresponding screen 104-1. After each of these three images have been completely rendered sequentially, the GPU may then composite these three images together for the final image presented on the display 104-1.

Since these render and composite operations were performed on the same GPU, these operations were performed sequentially. As more cameras are added to the immersive environment, and/or as higher-resolution rendering processes are used, the more time these operations will typically take. This may cause delays in generating the final composited image and result in image stuttering on the display 104-1 when the frames are delivered in time and the display update becomes delayed. Furthermore, with each other displays 104 rendering their own images, the same images may have been rendered multiple times. For example, the image associated with the second camera 112a overlaps with display 104-1 and display 104-2. Therefore, the GPUs for each of these displays would individually render the image associated with the second camera 112a in order to display the portions that overlap with those displays. There was no efficient way to share image data between the separate GPUs associated with the displays.

The embodiments described herein solve these and other problems by using a distributed rendering and/or compositing system. In some embodiments, the immersive content production system may render or generate the scenery images of a virtual scene and the camera images using a distributed rendering process. For example, the immersive content production system may include one or more rendering modules to render the images displayed by the displays 104 in real-time or at interactive frame rates. The rendering modules may each include, for example, one or more graphical processing units (GPUs) and/or other processors capable of rendering images. The one or more rendering modules may be configured to generate portions of the virtual scene associated with different frustums corresponding to the different taking cameras 112. In some embodiments, the one or more rendering modules of the immersive content generation system may be configured to communicate with a compositor module over a suitable network. The compositor module may include any suitable processing device, such as a workstation computer with a GPU. The compositor module may, in turn, be configured to communicate with the displays 104. The compositor module may be configured to process, control, manage, and/or synchronize the display of the images shown on the displays 104. The compositor module may be configured to operate the displays 104 in real-time and/or at interactive frame rates.

Figure 8:
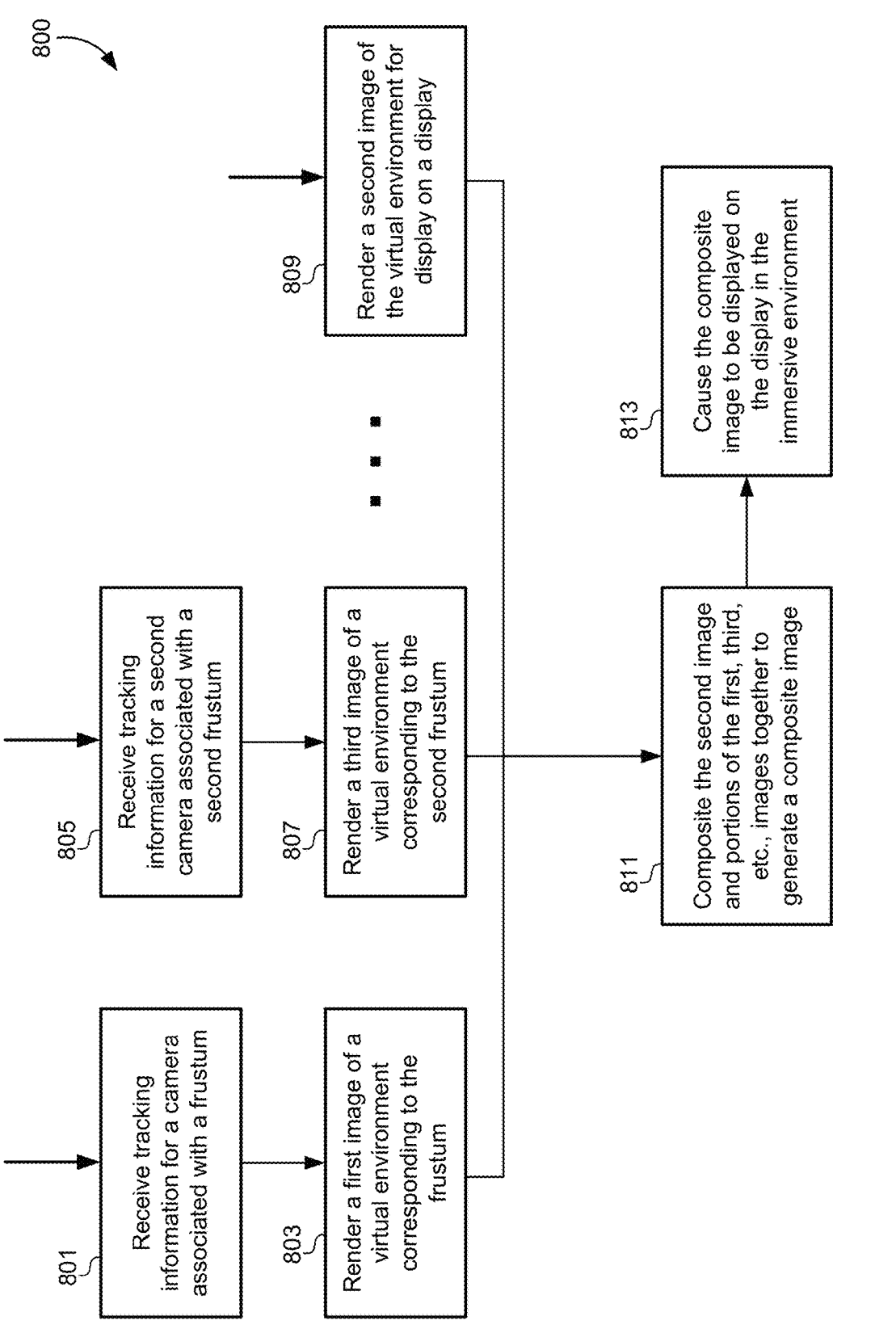
FIG. 8 illustrates a flowchart of a method for content production using distributed rendering and/or compositing, according to some embodiments.

FIG. 8 illustrates a flowchart of a method 800 for content production using distributed rendering and/or compositing, according to some embodiments. The method may include receiving tracking information for a camera associated with a frustum (801). For example, the camera may be configured to capture images of the subject in an immersive environment that includes one or more displays. In the example above, the camera 112b may be configured to capture images of a subject, such as the performer 210. The subject may also include objects, actors, animals, or any other points of interest in the immersive environment. The camera may be configured to capture images of the subject against a background formed by one or more of the displays 104. For example, the camera 112a may capture images against a background formed by display 104-1 and display 104-2. In contrast, the camera 112b may capture images against display 104-1 alone.

More than one camera may capture images simultaneously or in parallel. For example, camera 112b may be referred to as a "first" camera, camera 112a may be referred to as a "second" camera, and so forth. Each of these cameras may capture images in real time (805). Note that capturing the images in parallel from different cameras does not necessarily imply that the cameras are synchronized to capture images simultaneously. Images from different cameras may be captured out of phase with each other at the same or similar frame rates as described above.

The method 800 may also include rendering a first image of a virtual environment corresponding to the frustum (803). The first image may be rendered based on the tracking information from the camera to be perspective-correct when displayed on the one or more displays as viewed through the camera. For example, as described in detail above, the first image may be reprojected, skewed, or otherwise manipulated to be displayed on the curved display behind the subject to appear perspective-correct from the view of the camera. The first image may include a virtual environment.

Figure 9:
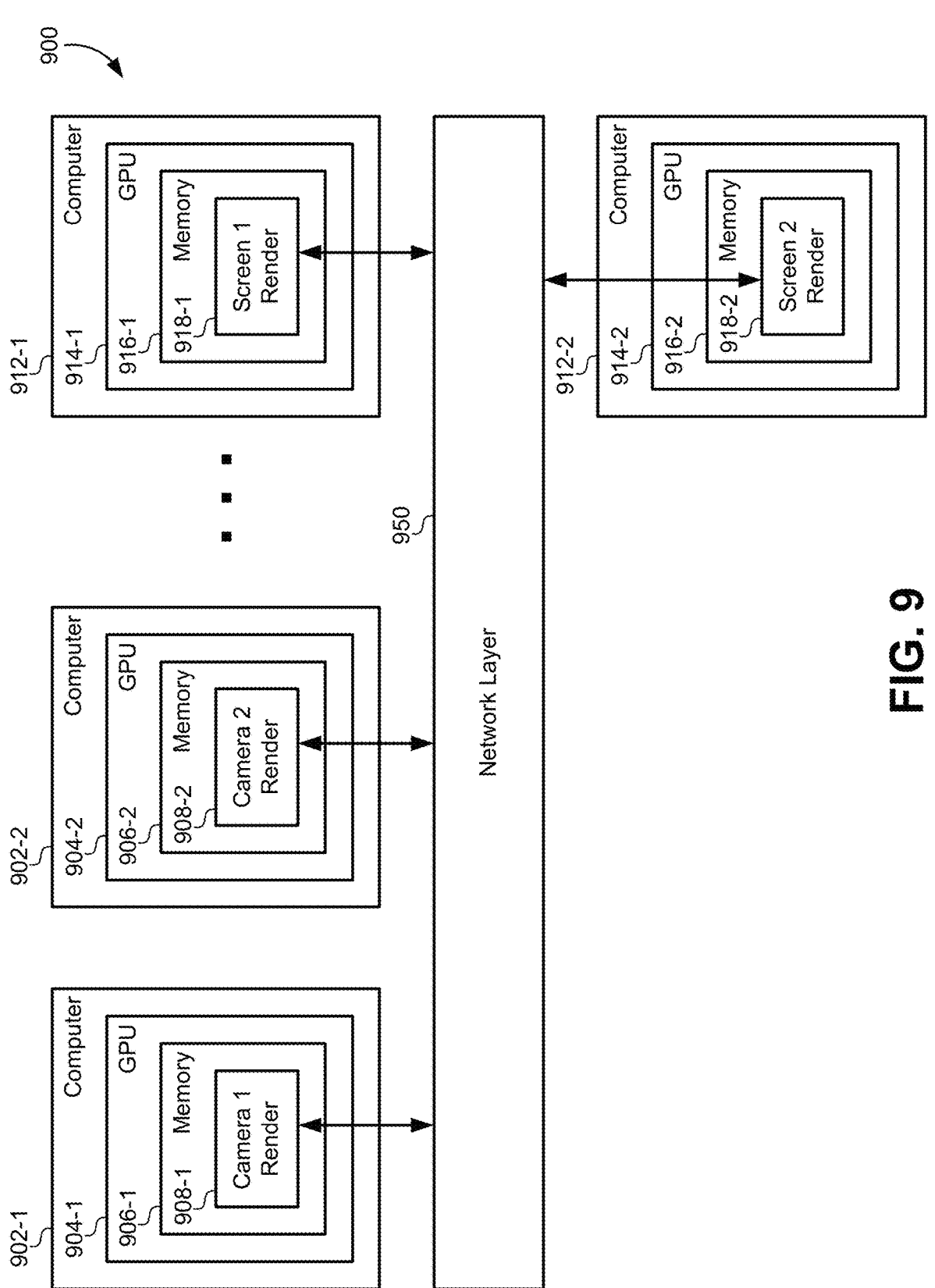
FIG. 9 illustrates an immersive content presentation system, according to some embodiments.
Figure 12:
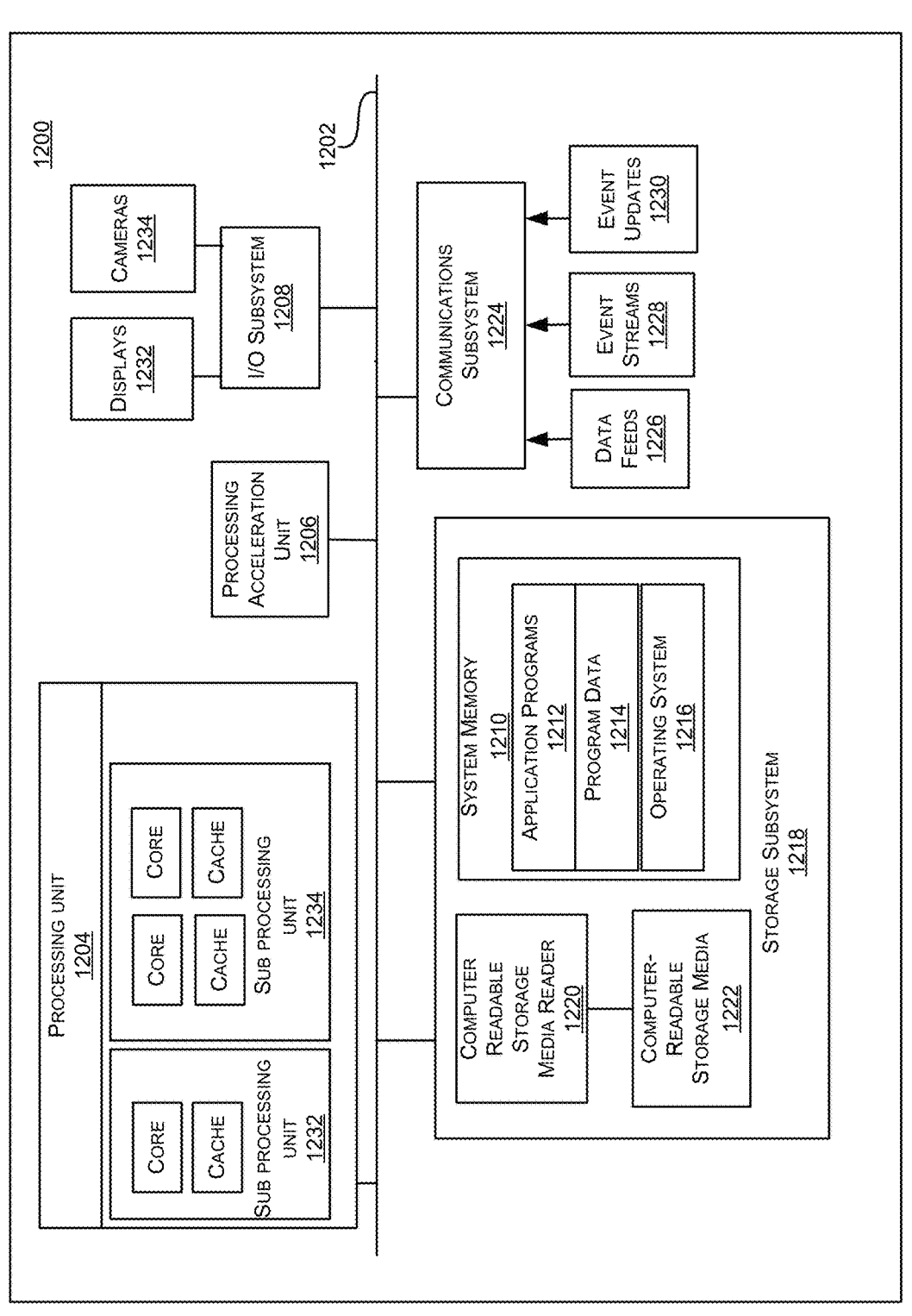
FIG. 12 illustrates a computer system, in which various embodiments described herein can be implemented.

FIG. 9 illustrates an immersive content presentation system 900, according to some embodiments. The system 900 may include a plurality of computer systems 902. Each of the computer systems 902 may include one or more processors. The one or more processors on each of the computer systems 902 may include GPUs 904. The processors or GPUs may be communicatively coupled with one or more non-transitory computer-readable storage media storing instructions that cause the processors or GPUs to execute the operations described below. An example of these computer systems is shown in FIG. 12. The one or more non-transitory computer-readable storage media may be distributed among a number of different computer systems, each of which may store a portion of instructions for performing the indicated operations. Each of the GPUs may include memories 906 that store images 908, 918 that are rendered by the GPUs 904. Each of these computer systems 902, 912 may be communicatively coupled together by a network layer 950. For example, the network layer 950 may include a network card that may be configured to perform Remote Direct Memory Access (RDMA) operations through the network connection between the different computer systems 902.

In some embodiments, the rendering modules described above may render a portion of the virtual scene from a particular camera perspective or frustum based on tracking data for one or more taking cameras 112, motion control rigs, performers, physical objects, virtual objects, etc. these rendering modules may be implemented on the processors or GPUs 904 of the computer systems 902. For example, a rendering module may determine the orientation, position, and/or predicted future positions/orientations of a taking camera 112b. Based on the determined orientation, position, and/or predicted future positions/orientations, the rendering module may render a perspective correct image of the frustum 318b. As another example, a rendering module may not render a virtual object if it is determined to be occluded by a performer based on the tracking data for the performer. The performers and/or objects may be in the performance area of the immersive content production system 200. As yet another example, a rendering module may adjust the lighting or color of a virtual scene based on the tracking data for a performer, physical object, virtual object, etc.

Instead of rendering a camera image using a computer system corresponding to a specific display, each camera may be associated with a specific computing system or GPU that renders perspective-correct images for that camera. For example, computer system 902-1 with GPU 904-1 may render images specifically for camera 112b. Similarly, computer system 902-2 with GPU 904-2 may render images specifically for camera 112a. Although not shown explicitly in FIG. 9, the immersive environment may include many additional cameras, each of which may be associated with a dedicated computer system and/or GPU. Therefore, each rendering module may render images based on a different corresponding frustum. In some embodiments, the rendering modules may perform pre-evaluation of non-rt dependent scene graph components. In certain embodiments, at least one rendering module may be configured to render a chroma-key image (e.g., green screen) for a particular frustum.

The method 800 may also include rendering a second image of the virtual environment for display on a display (809). This rendering operation may also be performed by a dedicated computer system that is separate and distinct from the other computer systems that perform rendering operations that are specific to individual frustums or cameras. For example, computer system 912-1 and/or GPU 914-1 may perform render operations that are specific to a display screen rather than being specific to a camera. The corresponding rendering module may be configured to render at least one background of the virtual scene for the corresponding screen. The background may include the lighting sources for the virtual scene. In some embodiments, the background may not correspond to a particular frustum of the virtual scene. Rather, the overall background may correspond with a predefined portion or the entirety of the virtual scene. For example, the background image need not be rendered based on the tracking information from any particular camera, but may instead be rendered as a general background image displayed around the screens in the immersive environment. As illustrated in FIG. 6, this particular screen for this operation may be visible by one or more of the cameras/frustums described above.

Note that the render operations may be performed in parallel on the different computer systems 902, 912. Specifically, instead of performing these render operation sequentially on a single GPU or system, the system 900 may perform these operations in parallel, with each render operation being specific to either a camera or a screen. These render operations may be performed simultaneously or at the same time when performed in parallel. However, the render operations are not required to start and/or end at the same time or be coordinated between the different computer systems 912 in any fashion.

The method may additionally include compositing the background image of a screen with the image(s) from the overlapping camera frustum(s) to form a composite image. For example, a first image rendered from the perspective of camera 112a may be composited with the background image on display 104-2 to generate a final composite image to be displayed on the physical screen. If additional camera frustums overlap with the particular screen, the overlapping portions of these rendered camera-specific images may also be composited in the final composite image. This compositing operation may take place after the rendering operations have completed. The compositing operation is generally much less resource intensive and takes far less processing power and time to complete. Therefore, the compositing operation may be performed sequentially after the render operations are complete without negatively affecting the interactive frame rates being displayed.

In order to efficiently transfer the images 908, 918 from the memories 906, 916 of the GPUs 904, 914, some embodiments may allow these memories to be directly accessed through the network connection with the network layer 950. For example, a rendering module may communicate its rendered frustum and/or background to one or more of the other rendering modules. In some embodiments, a rendering module may communicate its frustum or background to the other rendering modules using an RDMA process and broadcast/multicast communication. In some embodiments, the RDMA process and multicast communication may be performed using a packet-based communications protocol, such as the Internet Protocol (IP), ethernet, infiniband, etc. For example, a (layer 2) ethernet broadcast may reduce packet overhead. The protocol may be suitable for streaming data over a communications network to multiple rendering modules simultaneously or near simultaneously. By using RDMA and multicast communication, each rendering module can transfer the rendered frustum and/or background stored in its own memory directly to the memories of the other rendering modules without requiring the other rendering modules to process (e.g., render) the frustum/overall background at the CPU/main memory level. As a result, in some embodiments, each receiving rendering module would not perform re-rendering and/or duplicate processing in relation to the frustum/background of the other rendering modules. Such memory transfers between the rendering module memories may occur asynchronously. For example, the network layer 950 may include one or more network cards. The RDMA process may allow the network card to "peek" into the memories 908, 918 of the GPU's 906, 916 and directly retrieve the images 908, 918 from these memories. This may also occur in the opposite direction where memories are set to receive broadcasts ahead of time, and the sending side will hand off a completed block of memory (image data or, a fully formatted sequence of ethernet packets where the image is embedded in the packet payloads). This process is very efficient and does not require intermediate copies to be made in the network layer 950 or in the memory of the sending/receiving machines. Instead, images may be directly transferred from one GPU memory to another GPU memory.

By sharing frustums/backgrounds via RDMA and multicast communication, latency in generating a virtual scene can be reduced since the number of processing steps is reduced. After receiving the frustums and/or overall background of the other rendering modules, a rendering module may then overlay, layer or otherwise combine the frustums and overall background together based on priority values to generate a final framebuffer. In some instances, the priority values may be based on parameters and/or criteria input by a user of the immersive content production system. In other embodiments, the combination may be based on heuristics, machine learning, etc. In some embodiments, the priority values may be based, in part, on camera significance levels for the taking cameras 112. In some embodiments, only those rendering modules that rendered the background(s) receive and combine the frustums and backgrounds to generate the final framebuffer(s).

The compositor module may operate on any of the computer systems 902, 912 in the system 900. Since the compositing operation takes place sequentially after the rendering operations are complete, any of the GPUs or computers operating the rendering modules may also operate the compositing module. For example, computer system 912-1 may be dedicated to a particular screen (Screen 1) or display in the immersive environment. The computer system 912-1 may therefore render an image 918-1 that includes a background view of the virtual environment for that screen. Additionally, the computer system 912-1 may also operate the compositor module that retrieves the images 908 from the computer systems 902 specific to each of the cameras in the environment and performs the compositing operation. As described above, these images 908 may be retrieved directly from the memories 906 of the GPUs 904 through the network layer 950. The computer system 912-1 may perform the compositing operation using one or more processors present on the computer system 912-1. These one or more processors may include the GPU 914-1, or may include other processors that are separate and distinct from the GPU 914-1.

By way of example, one or more of the rendering modules from the camera GPUs may transmit the final framebuffer(s) to the compositor module. The compositor module may apply additional processing (e.g., user specified visual effects) to the final framebuffer(s) of the virtual scene. For example, the compositor module can perform crossfading from a fixed background to live content, freeze live content, change from one render source to another, keep content up on the displays 104 even if the rendering process crashes, return confidence feeds back to the users so that the users can determine when content is ready before the content is shown on the displays 104, etc.

In some embodiments, the compositor module may overlay, layer, or otherwise combine frustums and background rather than the rendering modules. In such an embodiment, the rendering modules transfer frustums/backgrounds to the compositor module without performing any combination/compositing. In some embodiments, the frustums may be updated at shorter intervals than the backgrounds. As such, the compositor module may combine multiple sets of frustums over several intervals with the same backgrounds. For example, a compositor module may combine a background image for a screen, along with portions of camera-specific images that overlap with the screen as viewed by the cameras. Conversely, a single camera image may be consumed by multiple compositor modules for multiple screens. For example, a rendered image for a camera that overlaps multiple screens may be consumed by compositor modules for each of the screens. These compositor modules need only retrieve the pixels from the camera GPU memory that overlap with the screen.

Figure 10:
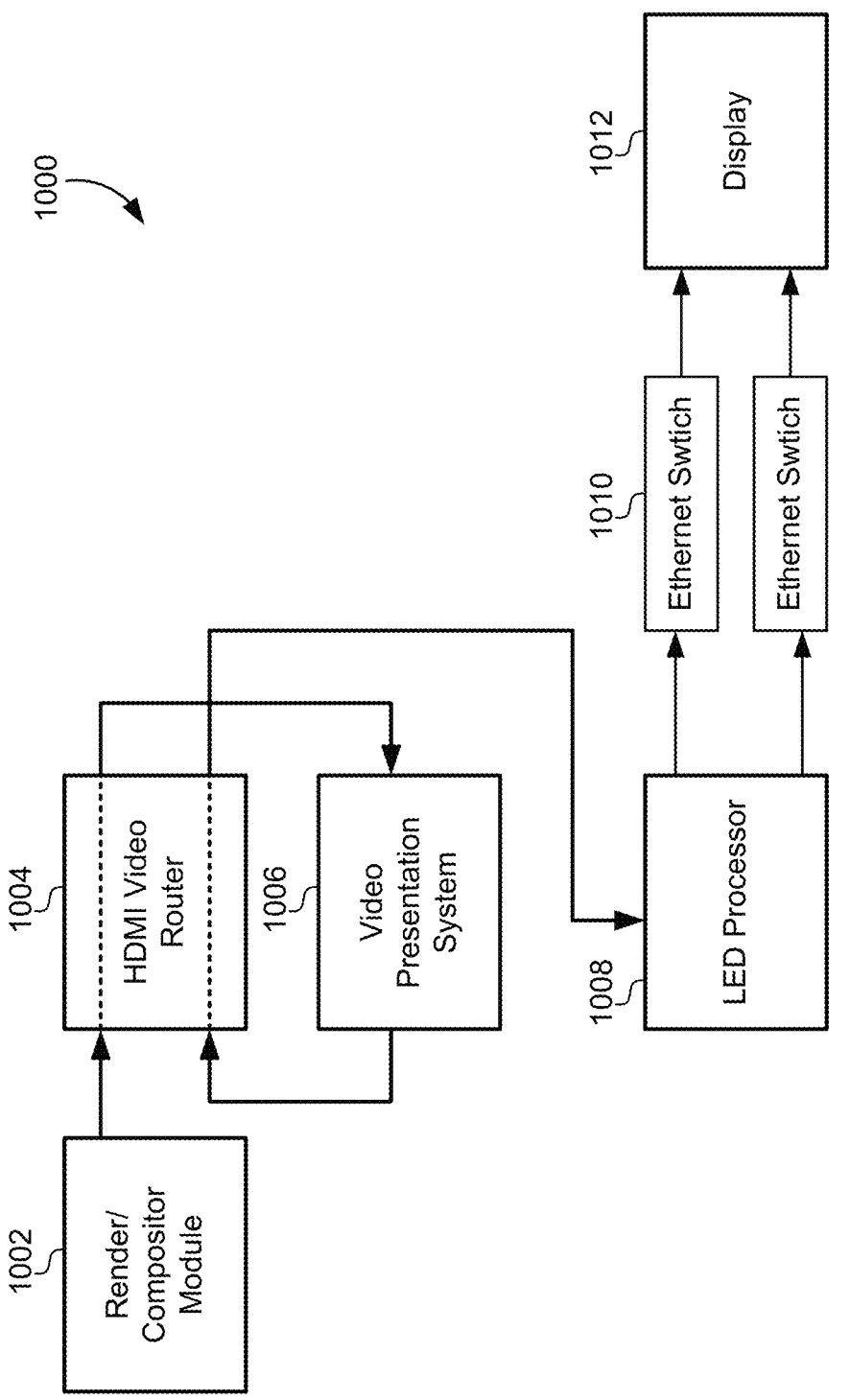
FIG. 10 illustrates a system for causing the composite image to be displayed on a display in the immersive environment.

In some embodiments, the final frame buffer storing the composite image may transmit the image directly to the displays. FIG. 10 illustrates a system 1000 for causing the composite image to be displayed on a display in the immersive environment. The compositor module 1002 operating on one of the computer systems described above may receive the images directly over the network from the GPU memories of the rendering modules. Note that the compositor module may be co-located on the same computer system as one of the rendering modules. The final frame buffer may then be converted into video data (e.g., an HDMI stream). The video data may then be transmitted from the compositor module 1002 through a video router 1004. The video router may send the video data to a video presentation system 1006 that is configured to accept multiple video inputs, mix these inputs together, change aspects of the video (e.g., color or timing), and provide individual video output streams for each screen. The output video streams may then be passed again through the video router 1004 to a display processor 1008. For example, the display processor 1008 may convert the video data into ethernet packets for each frame. These ethernet packets may then be passed through one or more ethernet switches 1010 having multiple bandwidths to the display 1012.

The system described in FIG. 10 adds multiple frame delays to the latency of the system. For example, the video presentation system 1006 may add at least one frame of delay as the video data is processed. The display processor 1008 may also add a frame of delay in converting the video data to individual network packets. In order to improve the latency of the system, some embodiments may avoid converting the final frame buffer of the composited image into video data. Instead, these embodiments may convert the final frame but into network packets that are transmitted directly to the display 1012.

Figure 11:
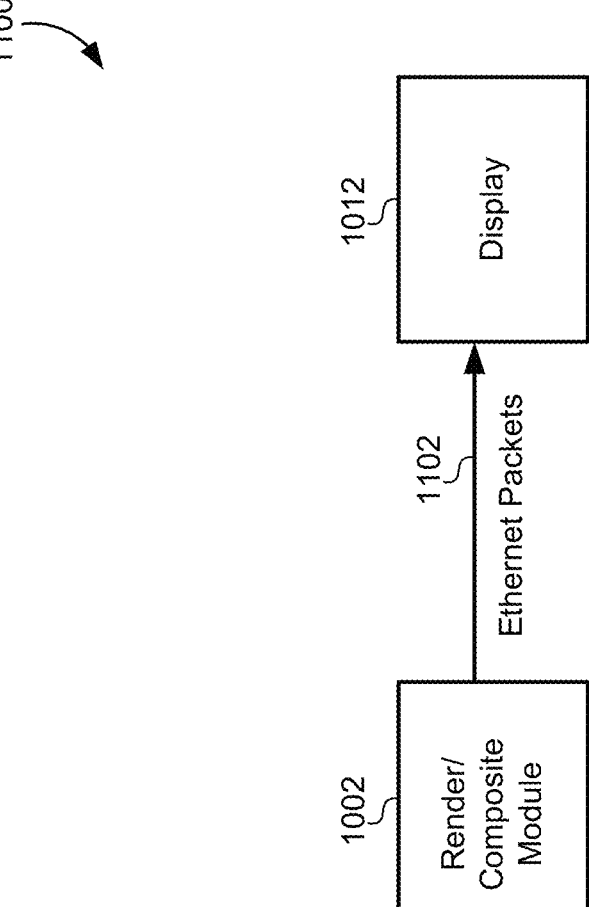
FIG. 11 illustrates a system that transmits the final frame buffer to the display 1012 using a network packet protocol, according to some embodiments.

FIG. 11 illustrates a system 1100 that transmits the final frame buffer to the display 1012 using a network packet protocol, according to some embodiments. As described above, the GPU memories may transmit the rendered images over the network using network packets rather than video data. These embodiments may also take the final frame buffer and convert the frame data into network packets (e.g., Ethernet packets). More specifically, the compositor module may convert the final framebuffer based on a communications protocol directly consumable by the display 1012. In some embodiments, the communications protocol may be a packet-based communications protocol. In particular, communications based on the communications protocol may include unicast packets of pixel data for the final framebuffer and high precision broadcast packets for final framebuffer selection. In some embodiments, the communications protocol may be different from the communications protocol used by the rendering modules to communicate frustums/backgrounds via RDMA. In some embodiments, the compositor module may be configured to communicate and cause a virtual scene to be displayed on the display 1012 without accessing controllers or a baseband corresponding to the display 1012. In some embodiments, the compositor module 1002 may control and manage the PWM cycles of the displays 104. Alternatively, the compositor module 1002 may synchronize updates if the PWM of the display panels are at the LED driver level. For example, the display framebuffer on the panel processor may be populated, and a broadcast packet may trigger the panel to present that image synchronously across each of the panels on the wall/display of the immersive environment. In doing so, further processing and latency can be reduced.

In some embodiments, the compositor module 1002 may utilize the PTP timings of a master clock of the immersive content production system to synchronize the display of images on the displays. More specifically, broadcast packets based on the master clock may be sent to the displays in accordance with PTP timings to indicate when and which images should be displayed across the different displays. In some embodiments, the master clock may receive a synchronization signal (e.g., from gps) from a management module of the content production system, lock a very high-accuracy internal clock to the signal, and generate a number of precisely aligned output signals in various formats (timecode, reference, SDI test patterns, NTP, PTP, SMTTE 2110, and a number of other audio and synchronization outputs). The outputs from the master clock (typically 2 clocks and a failover unit called an ACO) may be distributed to one or more components of the immersive content production system, where synchronization is beneficial or required.

As a result of the above, the immersive content production system may display highly detailed virtual scenes in real-time with reduced latency levels. Specifically, the images presented on the displays and captured by each taking camera may be continuously updated, with reduced delays, to be perspective correct for each taking camera based on the movement of the taking camera.

Each of the embodiments disclosed herein can be implemented in a special-purpose computer system. FIG. 12 illustrates a computer system 1200, in which various embodiments described herein can be implemented. The system 1200 can be used to implement any of the computer systems described above. As shown in the figure, computer system 1200 includes a processing unit 2904 that communicates with a number of peripheral subsystems via a bus subsystem 1202. These peripheral subsystems can include a processing acceleration unit 1206, an I/O subsystem 1208, a storage subsystem 1218, and a communications subsystem 1224. Storage subsystem 1218 includes tangible computer-readable storage media 1222 and a system memory 1210.

Bus subsystem 1202 provides a mechanism for letting the various components and subsystems of computer system

1200 communicate with each other as intended. Although bus subsystem 1202 is shown schematically as a single bus, alternative embodiments of the bus subsystem can utilize multiple buses. Bus subsystem 1202 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional micropro-cessor or microcontroller), controls the operation of com-puter system 1200. One or more processors can be included in processing unit 1204. These processors can include single core or multicore processors. In certain embodiments, pro-cessing unit 1204 can be implemented as one or more independent processing units 1232 and/or sub processing unit 1234 with single or multicore processors included in each processing unit. In other embodiments, processing unit 1204 can also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable pro-gramming, processor(s) 1204 can provide various function-alities described above. Computer system 1200 can addi-tionally include a processing acceleration unit 1206, which can include a digital signal processor (DSP), a special-purpose processor, and/or the like. And, in some embodi-ments, the processing unit or another component of system 1200 can include and/or operate a real-time gaming engine or other similar real-time rendering engine. Such an engine can render two-dimensional (2D) images from 3D data at interactive frame rates (e.g., 24, 48, 72, 96, or more frames per second). In one aspect, the real-time gaming engine can load the virtual environment for display on the displays surrounding the performance area. In some embodiments, the real-time gaming engine can load virtual assets into the virtual environment. The real-time gaming engine can then permit the virtual assets to interact or move according to simulated physics information stored by the real-time gam-ing engine. The real-time gaming engine can also update the virtual environment based on the movement and orientation of the taking camera(s).

I/O subsystem 1208 can include user interface input devices and user interface output devices. User interface input devices can include a keyboard, pointing devices such as a mouse or trackball, a touchpad or touch screen incor-porated into a display, a scroll wheel, a click wheel, a dial, a button, a switch, a keypad, audio input devices with voice command recognition systems, microphones, and other types of input devices. User interface input devices can include, for example, motion sensing and/or gesture recog-nition devices such as the Microsoft Kinect® motion sensor that enables users to control and interact with an input device, such as the Microsoft Xbox® 360 game controller, through a natural user interface using gestures and spoken commands. User interface input devices can also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands. In some embodiments, the user interface devices enable an operator to provide input indicating the types of virtual assets and/or effects to be integrated into the virtual environment dis-played during the performance. The operator can also indi-cate the particular configurations or trigger movements of the performer and/or physical objects in the performance area that are to be used to begin the loading and presentation of certain virtual assets. In some embodiments, the input received from the operator can occur in real-time and/or concurrently with a performance The system 1200 can include one or more displays 1232. The displays 1232 can be the displays 104 depicted in FIG. 1. The displays 1232 can form an enclosed performance area. In some embodiments, the displays 1232 can be formed from multiple light emitting diode (LED) panels. In some embodiments, the displays 1232 can be formed via multiple liquid crystal display (LCD) panels or thin-film transistor liquid-crystal display (TFT LCD) panels.

The system 1200 can include one or more cameras 1234. The one or more cameras can be digital cameras. Digital cinematography captures motion pictures digitally in a pro-cess analogous to digital photography. Professional cameras can include the Sony CineAlta(F) Series, Blackmagic Cin-ema Camera, RED ONE, Arriflex D-20, D-21 and Alexa, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System. Digital cinematography cameras can capture images using comple-mentary metal-oxide semiconductor (CMOS) or charge coupled device (CCD) sensors, usually in one of two arrangements. Single chip cameras that are designed spe-cifically for the digital cinematography market often use a single sensor (much like digital photo cameras), with dimen-sions similar in size to a 16 or 35 mm film frame or even (as with the Vision 65) a 65 mm film frame. An image can be projected onto a single large sensor exactly the same way it can be projected onto a film frame, so cameras with this design can be made with positive lock (PL), Panavision (PV) and similar mounts, in order to use the wide range of existing high-end cinematography lenses available. Their large sen-sors also let these cameras achieve the same shallow depth of field as 35 or 65 mm motion picture film cameras, which many cinematographers consider an essential visual tool.

Unlike other video formats, which are specified in terms of vertical resolution (for example, 1080p, which is 1920× 1080 pixels), digital cinema formats are usually specified in terms of horizontal resolution. As a shorthand, these reso-lutions are often given in "nK" notation, where n is the multiplier of 1224 such that the horizontal resolution of a corresponding full-aperture, digitized film frame is exactly 1024n pixels.

For instance, a 2K image is 2048 pixels wide, and a 4K image is 4096 pixels wide. Vertical resolutions vary with aspect ratios though; so a 2K image with an HDTV (16:9) aspect ratio is 2048×1152 pixels, while a 2K image with a standard definition television (SDTV) or Academy ratio (4:3) is 2048×1536 pixels, and one with a Panavision ratio (2.39:1) would be 2048×856 pixels, and so on. Due to the "nK" notation not corresponding to specific horizontal resolutions per format a 2K image lacking, for example, the typical 35 mm film soundtrack space, is only 1828 pixels wide, with vertical resolutions rescaling accordingly.

All formats designed for digital cinematography are progressive scan, and capture usually occurs at the same 24 frame per second rate established as the standard for 35 mm film. Some films have a High Frame Rate of 48 fps, although most traditional theaters use 24 fps. The DCI standard for cinema usually relies on a 1.89:1 aspect ratio, thus defining the maximum container size for 4K as 4096×2160 pixels and for 2K as 2048×1080 pixels.

Broadly, several workflow paradigms can be used for data acquisition and storage in digital cinematography. With video-tape-based workflow, video is recorded to tape on set. This video is then ingested into a computer running non-linear editing software, using a deck. Upon ingestion, a digital video stream from tape is converted to computer files. These files can be edited directly or converted to an intermediate format for editing. Then video is output in its final format, possibly to a film recorder for theatrical exhibition, or back to video tape for broadcast use. Original video tapes are kept as an archival medium. The files generated by the non-linear editing application contain the information necessary to retrieve footage from the proper tapes, should the footage stored on the computer's hard disk be lost. With increasing convenience of file-based workflows, the tape-based workflows have become marginal in recent years.

Digital cinematography can use tapeless or file-based workflows. This trend has accelerated with increased capacity and reduced cost of non-linear storage solutions such as hard disk drives, optical discs, and solid-state memory. With tapeless workflows digital video is recorded as digital files onto random-access media like optical discs, hard disk drives or flash memory-based digital magazines. These files can be easily copied to another storage device, typically to a large RAID (array of computer disks) connected to an editing system. Once data is copied from the on-set media to the storage array, they are erased and returned to the set for more shooting.

Such RAID arrays, both of managed (for example, storage area networks (SANs) and networked attached storage (NASs) and unmanaged (for example, just a bunch of disks (JBoDs) on a single computer workstation), are necessary due to the throughput required for real-time (320 Megabits per second for 2K @ 24 frames per second) or near-real-time playback in post-production, compared to throughput available from a single, yet fast, hard disk drive. Such requirements are often termed as on-line or cloud storage. Post-production not requiring real-time playback performances (typically for lettering, subtitling, versioning and other similar visual effects) can be migrated to slightly slower RAID stores.

Short-term archiving, if ever, is accomplished by moving the digital files into slower redundant array of independent disks (RAID) arrays (still of either managed or unmanaged type, but with lower performances), where playback capability is poor to non-existent (unless via proxy images), but minimal editing and metadata harvesting still feasible. Such intermediate requirements easily fall into the mid-line storage category.

Long-term archiving is accomplished by backing up the digital files from the RAID, using standard practices and equipment for data backup from the information technology industry, often to data tapes (like linear tape open (LTOs)).

The system can include one or more spherical cameras. A spherical camera can be called an omnidirectional camera, also known as 360-degree camera, is a camera having a field of view that covers approximately the entire sphere or at least a full circle in the horizontal plane. 360-degree videos, also known as immersive videos, or spherical videos, are video recordings where a view in every direction is recorded at the same time, shot using an omnidirectional camera or a collection of cameras. During playback on normal flat display the viewer has control of the viewing direction like a panorama. It can also be played on a displays or projectors arranged in a sphere or some part of a sphere.

360-degree video is typically recorded using either a special rig of multiple cameras, or using a dedicated camera that contains multiple camera lenses embedded into the device, and filming overlapping angles simultaneously. Through a method known as video stitching, this separate footage is merged into one spherical video piece, and the color and contrast of each shot is calibrated to be consistent with the others. This process is done either by the camera itself, or using specialized software that can analyze common visuals and audio to synchronize and link the different camera feeds together. Generally, the only area that cannot be viewed is the view toward the camera support.

360-degree video is typically formatted in an equi-rectangular projection and is either monoscopic, with one image directed to both eyes, or stereoscopic, viewed as two distinct images directed individually to each eye for a 3D effect. Due to this projection and stitching, equi-rectangular video exhibits a lower quality in the middle of the image than at the top and bottom.

Specialized omnidirectional cameras and rigs have been developed for the purpose of filming 360-degree video, including rigs such as GoPro's Omni and Odyssey (which consist of multiple action cameras installed within a frame), and contained cameras like the HumanEyes Vuze and Nokia OZO, There have also been handheld dual-lens cameras such as the Ricoh Theta S, Samsung Gear 360, Garmin VIRB 360, and the Kogeto Dot 360—a panoramic camera lens accessory developed for the iPhone 4, 4S, and Samsung Galaxy Nexus.

User interface input devices can also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices can include, for example, medical imaging input devices such as computed tomography, magnetic resonance imaging, position emission tomography, medical ultrasonography devices. User interface input devices can also include, for example, audio input devices such as MIDI keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Computer system 1200 can comprise a storage subsystem 1218 that comprises software elements, shown as being currently located within a system memory 1210. System memory 1210 can store program instructions that are loadable and executable on processing unit 1204, as well as data generated during the execution of these programs.

Depending on the configuration and type of computer system 1200, system memory 1210 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 can include multiple different types of memory, such as static random access memory (SRAM) or dynamic random access memory (DRAM). In some implementations, a basic input/output system (BIOS), containing the basic routines that help to transfer information between elements within computer system 1200, such as during start-up, can typically be stored in the ROM. By way of example, and not limitation, system memory 1210 also illustrates application programs 1212, which can include client applications, web browsers, mid-tier applications, relational database management systems (RDBMS), etc., program data 1214, and an operating system 1216. By way of example, operating system 1216 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 can also provide a tangible computer-readable storage medium for storing the basic programming and data constructs that provide the functionality of some embodiments. Software (programs, code modules, instructions) that when executed by a processor provide the functionality described above can be stored in storage subsystem 1218. These software modules or instructions can be executed by processing unit 1204. Storage subsystem 1218 can also provide a repository for storing data used in accordance with the present invention.

Storage subsystem 1200 can also include a computer-readable storage media reader 1220 that can further be connected to computer-readable storage media 1222. Together and, optionally, in combination with system memory 1210, computer-readable storage media 1222 can comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 can include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 can include, but is not limited to, Zip® drives, flash memory cards, universal serial bus (USB) flash drives, secure digital (SD) cards, DVD disks, digital video tape, and the like. Computer-readable storage media 1222 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media can provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 can enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 can also receive input communication in the form of structured and/or unstructured data feeds 1226, event streams 1228, event updates 1230, and the like on behalf of one or more users who can use computer system 1200.

By way of example, communications subsystem 1224 can be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 can also be configured to receive data in the form of continuous data streams, which can include event streams 1228 of real-time events and/or event updates 1230, that can be continuous or unbounded in nature with no explicit end. Examples of applications that generate continuous data can include, for example, sensor data applications, financial tickers, network performance measuring tools (e.g. network monitoring and traffic management applications), clickstream analysis tools, automobile traffic monitoring, and the like.

Communications subsystem 1224 can also be configured to output the structured and/or unstructured data feeds 1226, event streams 1228, event updates 1230, and the like to one or more databases that can be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine-readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of content production, the method comprising:
receiving tracking information for a camera associated with a frustum, wherein the camera is configured to capture images of a subject in an immersive environment comprising one or more displays;
rendering, using a first rendering process performed by a first Graphics Processing Unit (GPU), a first image of a virtual environment corresponding to the frustum, wherein the first image is rendered based on the tracking information for the camera to be perspective-correct when displayed on the one or more displays and viewed through the camera;
rendering, using a second rendering process performed by a second GPU that shares a network connection with the first GPU, a second image of the virtual environment for display on a display in the one or more displays, wherein the first image and the second image are rendered in parallel, and;
compositing, using a third GPU, the second image and a portion of the first image together to generate a composite image, wherein the portion of the first image corresponds to a portion of the display captured by the frustum, wherein the third GPU generates the composite image by directly accessing the first image in a memory of the first GPU and by directly accessing the second image in a memory of the second GPU using Remote Direct Memory Access (RDMA) operations through the network connection; and causing the composite image to be displayed on the display in the immersive environment.

2. The method of claim 1, wherein the composite image is displayed as part of a real-time video sequence presented on the display at interactive frame rates.

3. The method of claim 1, wherein the first rendering process renders the first image while the second rendering process renders the second image, and the composite image is generated after the first image and the second image have been rendered.

4. The method of claim 1, wherein the second image comprises a background image that is not rendered based on the tracking information for the camera.

5. An immersive content presentation system comprising:
a first Graphics Processing Unit (GPU) that is configured to:
receive tracking information for a camera associated with a frustum, wherein the camera is configured to capture images of a subject in an immersive environment comprising one or more displays; and
render a first image of a virtual environment corresponding to the frustum, wherein the first image is rendered based on the tracking information for the camera to be perspective-correct when displayed on the one or more displays and viewed through the camera;
a second GPU that is configured to:
render a second image of the virtual environment for display on a display in the one or more displays, wherein the first image and the second image are rendered in parallel;
one or more processors that are configured to composite the second image and a portion of the first image together to generate a composite image, wherein the portion of the first image corresponds to a portion of the display captured by the frustum; and
a network card that is communicatively coupled to the first GPU, the second GPU, and the one or more processors, wherein the network card is configured to access a memory of the first GPU to retrieve the first image for the one or more processors, and to access a memory of the second GPU to retrieve the second image for the one or more processors.

6. The system of claim 5, wherein the one or more processors include the second GPU, such that the second GPU renders the second image and generates the composite image.

7. The system of claim 5, further comprising a third GPU that is configured to:
render a third image of the virtual environment for display on a second display in the one or more displays, wherein the first image and the third image are rendered in parallel; and
composite the third image and a second portion of the first image together to generate a second composite image, wherein the second portion of the first image corresponds to a portion of the second display captured by the frustum.

8. The system of claim 5, further comprising a third GPU that is configured to:
receive second tracking information for a second camera associated with a second frustum, wherein the second camera is configured to capture second images of a subject in the immersive environment; and
render a third image of the virtual environment corresponding to the second frustum, wherein the third image is rendered based on the second tracking information for the second camera to be perspective-correct when displayed on the one or more displays and viewed through the second camera; and wherein the first image, the second image, and the third image are rendered in parallel.

9. The system of claim 8, wherein the one or more processors are further configured to composite the second image, the portion of the first image, and a portion of the third image together to generate the composite image, wherein the portion of the third image corresponds to a portion of the display captured by the second frustum.

10. The system of claim 8, wherein transferring the first image from the memory of the first GPU to the one or more processors does not require intermediate copies of the first image to be made in a host memory prior to being sent by the network card.

11. One or more non-transitory computer-readable media storing instructions that, when executed by one or more Graphics Processing Units (GPUs) or processors, cause the one or more GPUs or processors to perform operations comprising:

receiving tracking information for a camera associated with a frustum, wherein the camera is configured to capture images of a subject in an immersive environment comprising one or more displays;

rendering, using a first GPU, a first image of a virtual environment corresponding to the frustum, wherein the first image is rendered based on the tracking information for the camera to be perspective-correct when displayed on the one or more displays and viewed through the camera;

rendering, using a second GPU, a second image of the virtual environment for display on a display in the one or more displays, wherein the first image and the second image are rendered in parallel;

compositing the second image and a portion of the first image together to generate a composite image, wherein the portion of the first image corresponds to a portion of the display captured by the frustum;

converting a framebuffer storing the composite image into broadcast packets;

transmitting the broadcast packets from the framebuffer to the display in the immersive environment without transforming the broadcast packets into a video format; and causing the composite image to be displayed on the display in the immersive environment.

12. The one or more non-transitory computer-readable media of claim 11, wherein a third GPU generates the composite image by directly accessing the first image in a memory of the first GPU and by directly accessing or broadcasting the second image in a memory of the second GPU using Remote Direct Memory Access (RDMA) operations through a network connection.

* * * * *